US012065934B2

(12) United States Patent
Johnson et al.

(10) Patent No.: US 12,065,934 B2
(45) Date of Patent: Aug. 20, 2024

(54) AEROSTATIC THRUST BEARING AND METHOD OF AEROSTATICALLY SUPPORTING A THRUST LOAD IN A SCROLL COMPRESSOR

(71) Applicant: TRANE INTERNATIONAL INC., Davidson, NC (US)

(72) Inventors: Jay H. Johnson, Houston, MN (US); Michael G. Benco, Onalaska, WI (US); Sung Hwa Jeung, Chatsworth, CA (US); Scott J. Smerud, La Crosse, WI (US); James Joseph Wiltzius, Forest Lake, MN (US)

(73) Assignee: TRANE INTERNATIONAL INC., Davidson, NC (US)

( * ) Notice: Subject to any disclaimer, the term of this patent is extended or adjusted under 35 U.S.C. 154(b) by 0 days.

(21) Appl. No.: 17/819,688

(22) Filed: Aug. 15, 2022

(65) Prior Publication Data
US 2023/0037942 A1    Feb. 9, 2023

Related U.S. Application Data

(63) Continuation of application No. 16/009,940, filed on Jun. 15, 2018, now Pat. No. 11,415,135, which is a
(Continued)

(51) Int. Cl.
*F01C 21/02*    (2006.01)
*F04C 18/02*    (2006.01)
(Continued)

(52) U.S. Cl.
CPC .......... *F01C 21/02* (2013.01); *F04C 18/0215* (2013.01); *F04C 18/0246* (2013.01);
(Continued)

(58) Field of Classification Search
CPC .. F01C 21/02; F04C 18/0215; F04C 18/0246; F04C 18/0253; F04C 23/008;
(Continued)

(56) References Cited

U.S. PATENT DOCUMENTS 3,518,021 A    6/1970    Lake et al.
4,366,993 A    1/1983    Ono et al.
(Continued)

FOREIGN PATENT DOCUMENTS

CN    102705235 A    10/2012
CN    203892194 U    10/2014
(Continued)

OTHER PUBLICATIONS

First Office Action; Chinese Patent Application No. 201810620817.7, May 8, 2021 (9 pages with English translation).
(Continued)

*Primary Examiner* — Dominick L Plakkoottam
*Assistant Examiner* — Paul W Thiede
(74) *Attorney, Agent, or Firm* — HSML P.C.

(57) ABSTRACT

A scroll compressor includes a first scroll member, a second scroll member, and an aerostatic thrust bearing. The aerostatic thrust bearing forms a layer of gas between the second scroll member and a fixed supporting member to support the second scroll member as the second scroll member rotates and/or orbits. Also disclosed is a method of supporting a rotating/orbiting scroll member in a scroll compressor. The method including supplying pressurized gas to an aerostatic thrust bearing such that a layer of gas is formed between the rotating/orbiting scroll member and a fixed supporting member.

18 Claims, 15 Drawing Sheets

Related U.S. Application Data continuation-in-part of application No. 15/889,838, filed on Feb. 6, 2018, now Pat. No. 10,865,792, which is a continuation of application No. 15/624,821, filed on Jun. 16, 2017, now Pat. No. 10,718,333.

(51) Int. Cl.
- *F04C 23/00* (2006.01)
- *F04C 27/00* (2006.01)
- *F04C 28/26* (2006.01)
- *F04C 29/02* (2006.01)
- *F16N 15/00* (2006.01)

(52) U.S. Cl.
CPC ........ *F04C 18/0253* (2013.01); *F04C 23/008* (2013.01); *F04C 27/001* (2013.01); *F04C 29/023* (2013.01); *F04C 29/028* (2013.01); *F16N 15/00* (2013.01); *F04C 28/26* (2013.01); *F04C 2240/50* (2013.01); *F04C 2240/54* (2013.01); *F16N 2210/14* (2013.01)

(58) Field of Classification Search
CPC .... F04C 27/001; F04C 29/023; F04C 29/028; F04C 28/26; F04C 2240/50; F04C 2240/54; F16N 15/00; F16N 2210/14
See application file for complete search history.

(56) References Cited

U.S. PATENT DOCUMENTS

| | | | |
|---|---|---|---|
| 4,575,320 A | 3/1986 | Kobayashi et al. | |
| 4,609,334 A | 9/1986 | Muir et al. | |
| 4,645,437 A * | 2/1987 | Sakashita | F04C 18/0215 418/57 |
| 4,696,630 A | 9/1987 | Sakata et al. | |
| 4,993,928 A * | 2/1991 | Fraser, Jr. | F04C 27/005 418/57 |
| 5,085,565 A | 2/1992 | Barito | |
| 5,169,294 A | 12/1992 | Barito | |
| 5,242,282 A | 9/1993 | Mitsunaga et al. | |
| 5,256,044 A | 10/1993 | Nieter et al. | |
| 5,588,820 A | 12/1996 | Hill et al. | |
| 5,591,014 A | 1/1997 | Wallis et al. | |
| 6,146,119 A | 11/2000 | Bush et al. | |
| 6,158,980 A | 12/2000 | Tsumagari et al. | |
| 6,776,593 B1 | 8/2004 | Cho | |
| 7,316,550 B2 | 1/2008 | Kim et al. | |
| 8,226,387 B2 | 7/2012 | Ignatiev et al. | |
| 10,487,831 B2 | 11/2019 | Ohta et al. | |
| 10,718,333 B2 * | 7/2020 | Johnson | F04C 18/0215 |
| 10,865,792 B2 * | 12/2020 | Johnson | F04C 18/0215 |
| 11,415,135 B2 * | 8/2022 | Johnson | F04C 29/028 |
| 2005/0152802 A1 * | 7/2005 | Kim | F04C 27/005 418/55.6 |
| 2007/0266632 A1 | 11/2007 | Tsangaris et al. | |
| 2010/0046862 A1 | 2/2010 | Schubert | |
| 2010/0226807 A1 | 9/2010 | Sato et al. | |
| 2010/0326108 A1 | 12/2010 | Schreiber et al. | |
| 2014/0119972 A1 * | 5/2014 | Ijiri | F04C 18/0215 418/55.6 |
| 2015/0037184 A1 | 2/2015 | Rood et al. | |
| 2016/0369803 A1 * | 12/2016 | Bessel | F04C 29/02 |

FOREIGN PATENT DOCUMENTS

| | | | |
|---|---|---|---|
| EP | 0655555 A1 | 5/1995 | |
| EP | 0747598 A2 | 12/1996 | |
| EP | 2891873 A1 * | 7/2015 | ............ F01D 5/027 |
| JP | H10-184567 A | 7/1998 | |
| WO | 2007/041818 A1 | 4/2007 | |
| WO | 2009/025230 A1 | 2/2009 | |

OTHER PUBLICATIONS

Extended European Search Report; European Patent Application No. 20187341.1, Oct. 16, 2020 (7 pages).

Extended European Search Report; European Patent Application No. 18178013.1, Jul. 27, 2018 (7 pages).

\* cited by examiner

AEROSTATIC THRUST BEARING AND METHOD OF AEROSTATICALLY SUPPORTING A THRUST LOAD IN A SCROLL COMPRESSOR

FIELD

This disclosure relates to bearings in scroll compressors and methods of providing lubrication in scroll compressors.

BACKGROUND

Scroll compressors utilize intermeshing scroll members to compress a fluid. Heating, ventilation, air conditioning, and refrigeration systems ("HVACR") may utilize scroll compressors to compress a gaseous refrigerant. A first scroll member can be intermeshed with a second scroll member. The second scroll member is rotated or orbited (non-fixed) relative to the first scroll member. During operation, the second scroll member is rotated or orbited such that volumes of gas (e.g., refrigerant) are compressed between the intermeshed scroll members. A thrust bearing can be provided to support the second, non-fixed, scroll member in the axial direction. A crankshaft within the scroll compressor may rotate the second, non-fixed, scroll member, and bearings can support the crankshaft while it rotates.

SUMMARY

A scroll compressor utilizes two scroll members with intermeshing spiral wraps to compress a gas, such as a refrigerant. A first scroll member has a spiral wrap. A second scroll member has a spiral wrap and is rotated or orbited relative to the first scroll member such that volumes of gas are trapped between the intermeshed spiral wraps of the first and second scroll members. The trapped volumes of gas are then compressed as the second scroll member rotates or orbits relative to the first scroll member. As the gas is compressed between the first and second scroll members, the gas can exert a force in the axial direction. This force may also be referred to as a thrust load.

In an embodiment, the scroll compressor includes a fixed supporting member for supporting the second scroll member in the axial direction. The scroll compressor also includes an aerostatic thrust bearing to support the second scroll member in the axial direction. The aerostatic thrust bearing supports the second scroll member such that the thrust load of the second scroll member does not significantly change the second scroll member's intermeshed position with the first scroll member in the axial direction. The aerostatic thrust bearing supports the second scroll member such that the axial ends of the spiral wrap of the second scroll member stay in contact with a baseplate of the first scroll member. The aerostatic thrust bearing includes a surface of the second scroll member, a surface of the fixed supporting member, and a gas distributing structure. In an embodiment, the fixed supporting member is a structure within the scroll compressor that has a fixed position relative to the second scroll member. The fixed supporting member also includes a surface that faces the baseplate. In an embodiment, the fixed supporting member is part of a bearing housing. The gas distributing structure in an embodiment may be located on the surface of the second scroll member and/or the surface of the fixed supporting member.

In an embodiment, the gas distributing structure is supplied with a pressurized gas and distributes the pressurized gas between the second scroll member and fixed supporting member over a surface area. For example, a gas distributing structure is a porous material that distributes the received pressured gas over said surface area. During the normal operation of the scroll compressor, the thrust load is applied to the second scroll member. The thrust load on the second scroll member could push the surface of the fixed supporting member against the surface of the second scroll member. However, in an embodiment, the gas distributing structure distributes a flow of pressurized gas between the surfaces of the second scroll member and the fixed supporting member. As the pressurized gas is distributed between the surfaces of the second scroll member and the fixed supporting member, the flowing pressurized gas prevents the surfaces from contacting (e.g., during normal operation).

In an embodiment, the aerostatic thrust bearing includes a gas distributing structure with an inner radial seal and an outer radial seal that are each located on the second scroll member or the fixed supporting member. The gas distributing structure also includes one or more openings in the second scroll member or the fixed supporting member. During operation, the gas distributing structure distributes pressurized gas into a space between the second scroll member and fixed supporting member in an axial direction and between the radial seals in a radial direction. During the normal operation of the scroll compressor, the thrust load on the second scroll member applies a force in the axial direction. However, in an embodiment, the flow of pressurized gas is into the space between the second scroll member and fixed supporting member. As the pressurized gas flows between through the space between the surfaces of the second scroll member and the fixed supporting member, the flowing pressurized gas prevents the surfaces from contacting (e.g., during normal operation), and the radial seals provide a flow resistance to the pressurized gas easily flowing out from the space between the surfaces of the second scroll member and the fixed supporting member.

In an embodiment, the thrust load pushes the second scroll member against the distributed pressurized gas flowing between the second scroll member and the fixed supporting member. As such, the distributed pressurized gas is formed into a layer (e.g., a thin film) between the second scroll member and the fixed supporting member. As the second scroll member pushes on the flowing layer of pressurized fluid, the second scroll member compresses the layer of flowing pressurized gas. For the second scroll member to move in the axial direction, the second scroll member in an embodiment further compresses the layer of flowing distributed pressurized gas. As the layer of pressurized gas is already compressed (e.g., pressurized), a large amount of force corresponds to a small amount of compression. In such a manner, the layer of flowing pressurized gas dampens and/or absorbs the thrust load of the second scroll member. Accordingly, the aerostatic thrust bearing supports the second scroll member in the axial direction. In an embodiment, the gas distribution structure utilizes a working fluid (e.g., a refrigerant, a refrigerant blend, or the like) of the compressor as the pressurized gas.

In an embodiment, a method is directed to supporting a rotating or orbiting scroll member in a scroll compressor. In the scroll compressor, a fixed supporting member is positioned within the scroll compressor such that a surface of the fixed supporting member faces a surface of the rotating or orbiting scroll member. The method in an embodiment includes providing a gas distributing structure on the surface of the fixed supporting member or the surface of the rotating or orbiting scroll member, supplying pressurized gas to the gas distributing structure, and the gas distributing structure forming a layer of gas between the rotating or orbiting scroll member and the fixed supporting member. The layer of gas is configured to support a thrust load of the rotating or orbiting scroll member.

In an embodiment, a scroll compressor utilizes one or more aerostatic bearings to support the crankshaft as it rotates. In an embodiment, one or more aerostatic radial bearings support the crankshaft in its radial direction as it rotates. An aerostatic radial bearing for supporting the crankshaft includes a radial surface (e.g., a journaled surface) of the crankshaft, a surface of a fixed supporting member that faces the crankshaft, and a gas distributing structure. In an embodiment, pressurized gas is supplied to the gas distributing structure and the aerostatic radial bearing forms a layer of flowing pressurized gas between the radial surface of the crankshaft and the surface of the fixed supporting member that faces the crankshaft. The layer of gas supports the crankshaft in the radial direction as it rotates. In an embodiment, the gas distributing structure for the aerostatic radial bearing may be located on the radial surface of the crankshaft and/or the surface of the fixed supporting member.

In an embodiment, a crankshaft aerostatic thrust bearing supports a crankshaft in the axial direction as it rotates. A crankshaft aerostatic thrust bearing includes an axial end surface of the crankshaft, a surface facing the axial end surface of the crankshaft, and a gas distributing structure. In an embodiment, pressurized gas is supplied to the gas distributing structure such that the crankshaft aerostatic thrust bearing forms a layer of gas between the axial end surface of the crankshaft and the surface facing the axial end surface. The layer of gas supports the crankshaft in the axial direction as it rotates. In an embodiment, the gas distributing structure for the crankshaft aerostatic thrust bearing may be located on the axial surface of the crankshaft and/or the axial surface of the fixed supporting member.

In an embodiment, an aerostatic radial bearing is provided around an eccentric end of the crankshaft that engages with the second scroll member. The aerostatic radial bearing includes a radial surface of the eccentric end of the crankshaft (e.g., a journaled surface of the eccentric end), a surface of the second scroll member (e.g., an inner surface of a sleeve of the second scroll member), and a gas distributing structure. In an embodiment, pressurized gas is supplied to the gas distributing structure such that the aerostatic radial bearing forms a layer of gas between the outer radial surface of the outer surface of the eccentric end and the surface of the second scroll member. The aerostatic radial bearing can allow the eccentric end to transfer its movement due to rotation to the second scroll member without transferring its rotation. In an embodiment, the gas distributing structure for the aerostatic radial bearing for the eccentric end of the crankshaft may be located on the surface of the second scroll member and/or the radial surface of the eccentric end of the crankshaft.

In an embodiment, for example as described above, one or more of the bearings of the bearings of the scroll compressor may utilize pressurized gas instead of other lubricants (e.g., oil) such that the compressor is an oil-free scroll compressor. In an embodiment, for example as described above, all of the bearings of the scroll compressor may utilize pressurized gas instead of other lubricants (e.g., oil) such that the compressor is an oil-free scroll compressor. In an embodiment, an oil-free scroll compressor may utilize the working fluid (e.g., a refrigerant, a refrigerant blend, or the like) of the compressor as the pressurized fluid.

DETAILED DESCRIPTION

Figure 1:
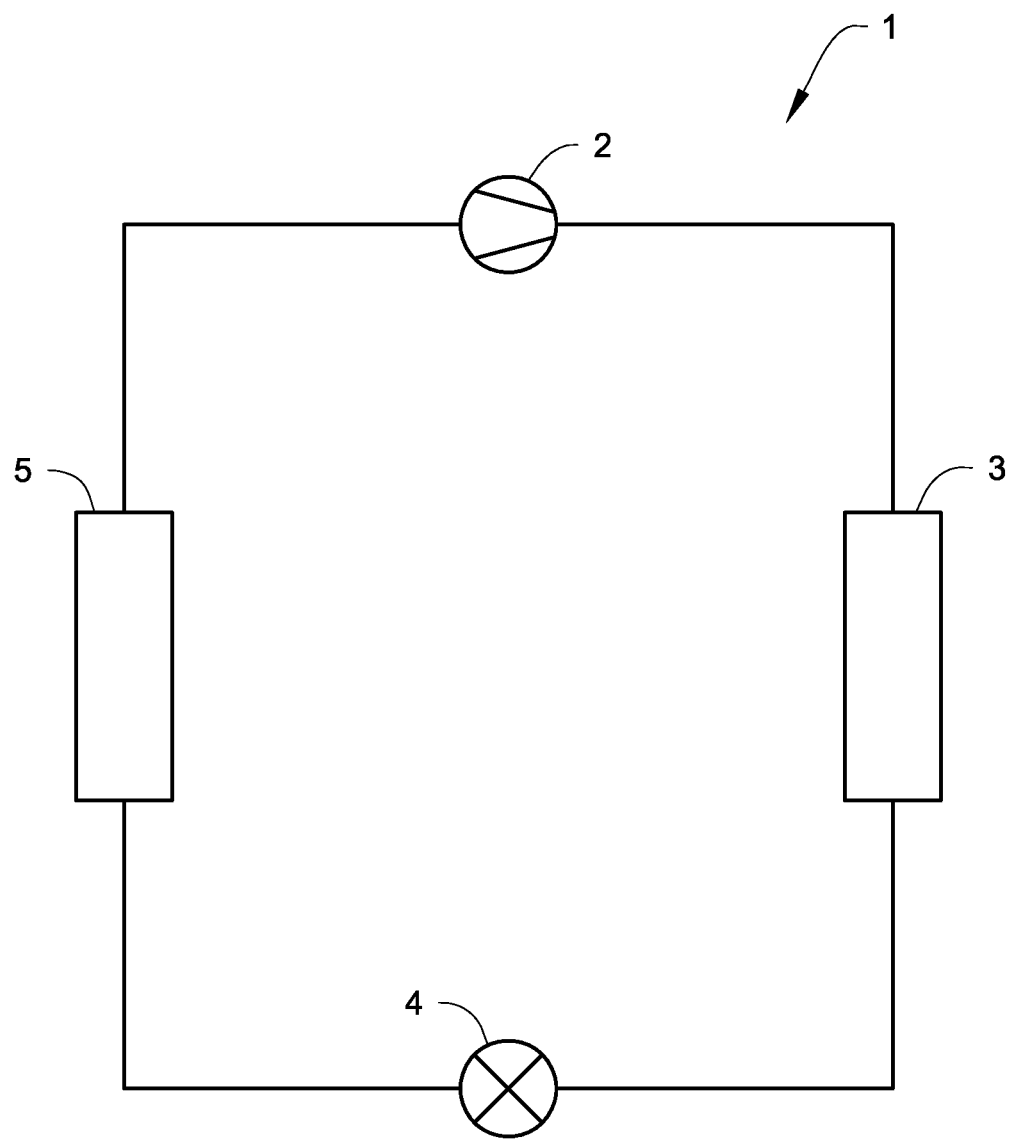
FIG. 1 shows a schematic diagram of a refrigerant circuit including a compressor, a condenser, an expansion device, and an evaporator.

Scroll compressors compress gas between the intermeshing spiral wraps of their scroll members. As the scroll members compress a gas between their spiral wraps, the compressed gas may push on the non-fixed scroll member in the axial direction. This pushing force, also referred to as a thrust load, may cause the non-fixed scroll member to become incorrectly positioned in the axial direction and/or contact other internal parts of the scroll compressor (e.g., a fixed supporting member, a bearing housing supporting the crankshaft). When incorrectly positioned, the ends of the spiral wrap of the non-fixed scroll member may not form a seal with the baseplate of the fixed scroll member as the non-fixed scroll member is not in contact with the fixed scroll member. The rotation or orbiting of the non-fixed scroll member can amplify the thrust load, especially towards the outer diameter of the baseplate of the non-fixed scroll member.

Some previous scroll compressors have utilized pressurized oil in the space behind the non-fixed scroll member to support the non-fixed scroll member in the axial direction. Some previous scroll compressors have utilized an oil-based thrust bearing between the fixed supporting member of the scroll compressor (e.g. a bearing housing) and the non-fixed scroll member to support the non-fixed scroll member in the axial direction. In some such previous scroll compressors, the thrust bearing typically included additional piece(s) that were placed between the non-fixed scroll member and fixed supporting member. These previous thrust bearings also require a flow of pressurized oil to support the non-fixed scroll member.

Some previous scroll compressors have utilized aerodynamic air bearings, which may also be referred to as thrust foil bearings, to support the non-fixed scroll member. An aerodynamic air bearing forms a dynamic cushion of air between the non-fixed scroll member and a support structure to support the non-fixed scroll member. Aerodynamic air bearings rely on the movement (e.g. the rotation or orbiting) of the non-fixed scroll member to provide support, which results in contact between the non-fixed scroll member and a support structure when stopping and starting of the scroll compressor. However, an aerodynamic air bearing provides weaker support relative to the area of its bearing surface (e.g. the surface of bearing that faces the supporting structure) as it requires a bearing surface that includes non-active surfaces.

Disclosed herein are embodiments of scroll compressors that utilize an aerostatic thrust bearing to support the non-fixed scroll member. In an embodiment, the aerostatic thrust bearing is supplied with a pressurized gas. The aerostatic thrust bearing includes a gas distributing structure that distributes the pressurized gas between the non-fixed scroll member and the fixed supporting member of the scroll compressor. In such a manner, a layer of flowing pressurized gas is formed to support the non-fixed scroll member and the thrust load. The aerostatic thrust bearing is an "aerostatic" type bearing as it forms a layer of flowing gas between its bearing surfaces from an incoming flow of gas. An "aerostatic" type bearing is different from an "aerodynamic" type bearing.

In an embodiment, the aerostatic thrust bearing provides a support for the non-fixed scroll member without requiring contact with the non-fixed scroll member. This is advantageous as the aerostatic thrust bearing in an embodiment provides lower frictional losses because it does not require any solid-to-solid contacts to provide support for the non-fixed scroll member. Further, the friction between the layer of flowing pressurized gas and the non-fixed scroll member is less than the friction between a liquid lubricant and the non-fixed scroll member. Less friction creates less shear stress in the lubricant. The aerostatic thrust bearing in an embodiment is advantageous as less energy is lost due to friction and/or shear stress of the pressurized gas than a thrust bearing that utilizes a liquid lubricant (e.g., oil). In an embodiment, the aerostatic thrust bearing is supplied with pressurized gas to support the non-fixed scroll member. In an embodiment, the flow of pressurized gas is not dependent upon the rotation of the non-fixed scroll member. As such, the support provided by the aerostatic thrust bearing in an embodiment is not dependent upon the rotation of the non-fixed scroll member or a crankshaft to provide support for the non-fixed scroll member. The aerostatic thrust bearings are advantageous as they can provide support during the starting and stopping of the compressor. Further, in an embodiment, the aerostatic thrust bearing is advantageous as it does not require non-active surfaces to support the non-fixed scroll member.

An embodiment of a scroll compressor may also include one or more aerostatic bearings to support the crankshaft of the compressor as it rotates. An embodiment may also include an aerostatic radial bearing for an end (e.g., an eccentric end) of the crankshaft that engages the non-fixed scroll member. Each aerostatic bearing may include a gas distributing structure. Each aerostatic bearing may utilize a pressurized gas to form a layer or layer of gas that supports the crankshaft as it rotates. In such a manner, the scroll compressor may be an oil-free scroll compressor. In an embodiment, the scroll compressor may be a scroll compressor for an HVACR system and the pressurized gas may be a refrigerant.

An HVACR system can be used to cool or heat one or more conditioned spaces. A HVACR system may utilize a working fluid (e.g., refrigerant) in a circuit to cool some type of process fluid (e.g., air, water). For example, an HVACR system in some instances will cool an area by performing work on a refrigerant that is in a heat exchange relationship with air. The cooled air may then be ventilated to an area to cool the area.

FIG. 1 is a schematic diagram of a heat transfer circuit 1, according to an embodiment. The heat transfer circuit 1 generally includes a compressor 2, a condenser 3, an expansion device 4, and an evaporator 5. In an embodiment, the heat transfer circuit 1 can be modified to include additional components. For example, in an embodiment, the heat transfer circuit 1 can include an economizer heat exchanger, one or more flow control devices, a receiver tank, a dryer, a suction-liquid heat exchanger, or the like.

The heat transfer circuit 1 can generally be applied in a variety of systems (e.g., a vapor compression system) utilized to control an environmental condition (e.g., temperature, humidity, air quality) in a space, which is typically referred to as a conditioned space. Exemplary systems including a heat transfer circuit 1 include, but are not limited to, HVACR systems, transportation refrigeration systems, and the like.

The components of the heat transfer circuit 1 are fluidly connected. The heat transfer circuit 1 can be configured as a cooling system (e.g., a fluid chiller of an HVACR, an air conditioning system, and the like) that can be operated in a cooling mode, and/or the heat transfer circuit 1 can be configured to operate as a heat pump system that can run in a cooling mode and a heating/defrost mode.

The heat transfer circuit 1 as described applies known principles of gas compression and cooling. The heat transfer circuit can be configured to heat or cool a process fluid (e.g., water, air). In an embodiment, the heat transfer circuit 1 may represent a chiller that cools a process fluid such as water or the like. In an embodiment, the heat transfer circuit 1 may represent an air conditioner and/or heat pump that includes a process fluid such as air or the like.

During the operation of the refrigerant circuit 1, a working fluid (e.g., refrigerant) flows into the compressor 2 from the evaporator 5 at a relatively lower pressure in a gaseous state. The compressor 2 compresses the gas into a high pressure state, which also heats the gas. After being compressed, the relatively higher pressure and higher temperature gas flows from the compressor 2 to the condenser 3. In addition to the refrigerant flowing through the condenser 3, an external fluid (e.g., external air, external water, chiller water, and the like) also flows through the condenser 3. In accordance with known principles, the external fluid absorbs the heat from the working fluid as it flows through the condenser 3. The working fluid condenses to liquid and then flows into the expansion device 4. The expansion device 4 reduces the pressure of the working fluid. The reduced pressure allows the working fluid to expand and be converted to a mixed vapor and liquid state. The relatively lower temperature, vapor/liquid working fluid then flows into the evaporator 5. A process fluid (e.g., air, water, and the like) also flows through the evaporator 5. In accordance with known principles, the working fluid absorbs heat from the process fluid as it flows through the evaporator 5. As the working fluid absorbs heat, the working fluid becomes evaporates to vapor. The working fluid then returns to the compressor 2. The above-described process continues while the heat transfer circuit 1 is operated, for example, in a cooling mode.

Figure 2:
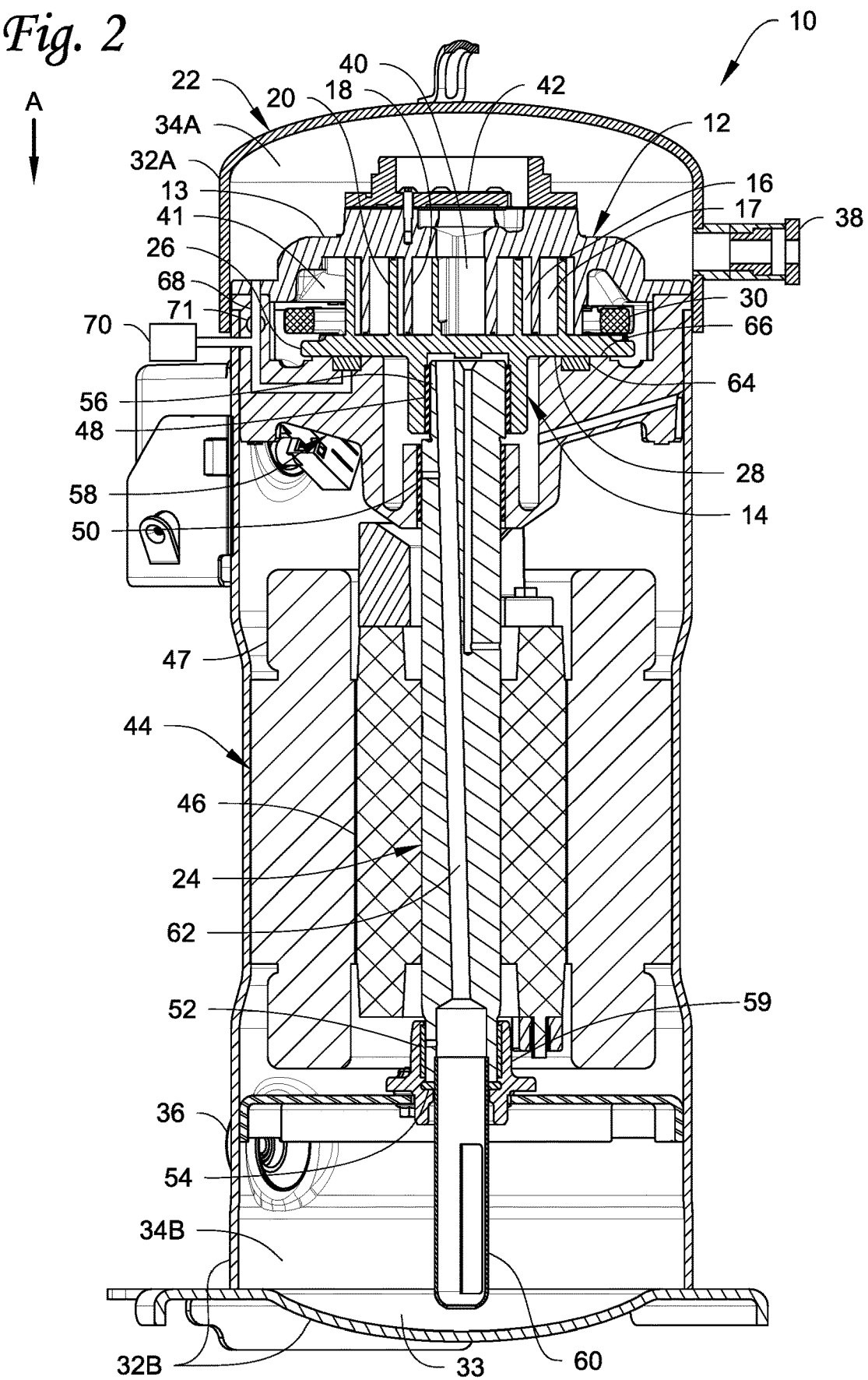
FIG. 2 shows a cross section of an embodiment of a vertical, single-stage scroll compressor including aerostatic thrust bearing including a gas distributing structure in a bearing housing.

FIG. 2 shows a cross section of an embodiment of a scroll compressor 10 having an aerostatic thrust bearing for supporting a non-fixed scroll member 14. The aerostatic thrust bearing includes a gas distributing structure 64 located on the surface of bearing housing 58. Although the embodiments shown herein are vertical, single-stage scroll compressors, it should be appreciated that the descriptions and features described herein may be applied to multi-stage scroll compressors, inclined scroll compressors, and/or horizontal scroll compressors as well. Further, it should be appreciated that the description and features described here may be applied to scroll compressors with co-orbiting scrolls or co-rotating scrolls.

The scroll compressor 10 shown in FIG. 2 may also be, for example, the compressor 2 in the refrigerant circuit 1 as described above for FIG. 1.

Applying known aspects of scroll compressor compression, a scroll compressor 10 may utilize two intermeshing scroll members 12, 14 to compress volumes of gas (e.g., trapped volume 16, trapped volume 17) between their respective intermeshing spiral wraps 18, 20. The scroll compressor 10 may have a non-fixed scroll member 14 and fixed scroll member 12. The fixed scroll member 12 is a scroll member that is in a fixed position within the external housing 22 and is not configured or designed to be rotated or moved (e.g., orbited) during the operation of the scroll compressor 10. The fixed scroll member 12 may be referred to as a fixed scroll, a non-orbiting scroll, or a stationary scroll. In an embodiment, the fixed scroll 12 can be directly attached to the external housing 22 of the scroll compressor 10. The fixed scroll 12 has a baseplate 13 and a spiral wrap 18 that projects in a direction towards the non-fixed scroll 14.

The non-fixed scroll member 14 is a scroll member that engages with an end of a crankshaft 24. During operation of the scroll compressor, the non-fixed scroll member is orbited relative to the fixed scroll member 12. The non-fixed scroll member 14 may also be referred to as an orbiting scroll, a rotating scroll, or the like. The orbiting scroll 14 has a baseplate 26 and a spiral wrap 20 that projects in a direction towards the fixed scroll 12. The baseplate 26 may also have a back surface 28 that faces in a direction that is generally opposite of the spiral wrap 20.

The fixed scroll 12 and the orbiting scroll 14, as shown in FIG. 2, are in their correct intermeshed positions relative to each other. When positioned correctly, the axial end of the spiral wrap 20 (e.g., the end of the spiral wrap not connected to the baseplate 26) of the orbiting scroll 14 contacts the baseplate 13 of the fixed scroll 12. Similarly, the axial end of the spiral wrap 18 (e.g. the end of the spiral wrap 18 not connected to the baseplate 13) of the fixed scroll 12 contacts the baseplate 26 of the orbiting scroll 14. This contact creates a seal between the spiral wraps 18, 20 and the opposing baseplates 13, 26, respectively, in the axial direction. This seal prevents the compressed gas from escaping from one trapped volume to another (e.g., from trapped volume 16 to trapped volume 17). In a vertical scroll compressor 10 as shown in FIG. 2, the axial direction is also the vertical direction.

In an embodiment, the axial end of one or both of the spiral wraps 18, 20 may include a tip seal to help encourage sealing between the spiral wraps and the opposing baseplate 13, 26. However, if the orbiting scroll 14 is moved in the axial direction, the described sealing of the trapped volumes (e.g., trapped volume 16, trapped volume 17) may not be sufficient. Typically, the movement of the fixed member is not a concern due to its fixed position. The loss of this sealing can lead to, for example, a loss of efficiency of the scroll compressor 10 or the inability of the scroll compressor 10 to compress the inlet gas.

In an embodiment, a scroll compressor 10 can include a coupling device, such as the Oldham coupling 30 shown in FIG. 2. In an embodiment, the coupling device (e.g. Oldham coupling 30) and a radial bearing 48 can be utilized so that the radial movement of the eccentric end 56 (relative to the crankshaft 24) is transferred to the orbiting scroll 14 without transferring the rotational movement. Accordingly, the orbiting scroll 14 orbits relative to the fixed scroll 12 without rotating in an embodiment.

It should be understood that the spiral wraps 18, 20 do not have to be perfectly spiral (e.g., Archimedean spiral, logarithmic spiral) in an embodiment. For example, in an embodiment, the curvature of the spiral wraps 18, 20 may be non-constant and/or an end portion of one (or both) of the spiral wraps 18, 20 may be non-spiral (e.g., a majority of the spiral wrap 18 may be spiral but an end portion may project radially).

In an embodiment, the external housing 22 of the scroll compressor 10 has an upper portion 32A and a lower portion 32B. In an embodiment, the volume contained within the upper portion 32A may be defined as the upper volume 34A of the scroll compressor 10 and the volume contained within the lower portion 32B may be defined as the lower volume 34B. As shown in the illustrated embodiment of FIG. 2, the upper volume 34A and the lower volume 34B are fluidly separated by the fixed scroll 12 and the orbiting scroll 14. In an embodiment, gas may only flow between the volumes 34A, 34B by traveling through the intermeshed scrolls 18, 20 (and being compressed) or the gas distributing structure 64 (as explained below). However, in an embodiment, the volumes 34A, 34B can be fluidly separated by, for example, other components of the scroll compressor 10 or other components and the scrolls 12, 14.

As shown in FIG. 2, the intermeshed spiral wraps 18, 20 in an embodiment have a discharge volume 40. In a scroll compressor 10, the discharge volume 40 is a volume where the intermeshed spiral wraps 18, 20 end and the compressed gas exits the scrolls 12, 14. The discharge volume 40 is fluidly connected to the upper volume 34A of the scroll compressor 10. A valve 42 (e.g., a check valve) can regulate the flow of pressurized gas between the upper volume 34A and the discharge volume 40.

During operation of the scroll compressor 10, the compressed gas flows out of the scroll compressor 10 by flowing from the discharge volume 40 to the upper volume 34A and through the discharge outlet 38. The intermeshed scrolls 12, 14 also have an inlet 41 where gas flows into the intermeshed scrolls 12, 14. The inlet 41 is fluidly connected to the lower volume 34B of the scroll compressor 10. Inlet gas (e.g., working fluid to be compressed by the scroll compressor 10) flows into the scroll compressor 10 through the suction inlet 36. During operation of the scroll compressor 10, inlet gas flows into the intermeshed scrolls 12, 14 by entering the scroll compressor 10 through the suction inlet 36, flowing through the lower volume 34B, and into the inlet 41.

In the illustrated embodiment, pressurized gas flows through the upper volume 34A to exit the scroll compressor 10. However, in an embodiment, the discharge volume 40 may be directly fluidly connected to the discharge outlet 38 such that gas exits the scroll compressor 10 by flowing directly from the discharge volume 40 to the discharge outlet 38.

As explained above, the orbiting scroll 14 in an embodiment is orbited by a crankshaft 24. The crankshaft 24 can be rotated by, for example, an electric motor 44. The electric motor 44 includes a rotor 46 and a stator 47. The rotor 46 and the crankshaft 24 are affixed together such that they rotate together. For example, the rotor 46 and crankshaft 24 can be affixed together using an interference fit or other type of fit. The electric motor 44 may operate using known principles to rotate the crankshaft 24. In an embodiment, the crankshaft 24 may be rotated by other mechanisms other than an electric motor 44, such as, for example, an external electric motor, an internal combustion engine, or other such mechanisms. Accordingly, such embodiments may not include the electric motor 44, rotor 46, and stator 47 as shown in FIG. 2.

In an embodiment, the scroll compressor 10 includes bearings 50, 52, 54 that can support crankshaft 24 while still allowing the crankshaft 24 to rotate. Radial bearings 50, 52 can support the crankshaft 24 in the radial direction while allowing the crankshaft 24 to rotate. A crankshaft thrust bearing 54 can support the crankshaft 24 in the axial direction while still allowing the crankshaft 24 to rotate. In an embodiment, a scroll compressor 10 may include one or more bearings 50, 52, 54 to support the crankshaft 24.

As shown in FIG. 2, an end 56 of the crankshaft 24 in an embodiment is an eccentric end 56 relative to the rest of the crankshaft 24. The eccentric end 56 is eccentric as the axis of the end of the crankshaft 24 is radially offset from the rotational axis of the crankshaft 24. The eccentric end 56 of the crankshaft 24 also includes a bearing 48. The bearing 48 can prevent the crankshaft 24 from transferring its rotation to the orbiting scroll 14. However, the radial movement of eccentric end 56 (e.g., the movement of the eccentric end 56 that is perpendicular to the axis of rotation) is still transferred to the orbiting scroll 14. As such, the orbiting scroll 14 in an embodiment orbits relative to the fixed scroll 12 instead of rotating. In embodiment, the radial bearings 48, 50, 52 may be, for example, ball bearings, roller bearings, or the like.

Thrust bearing 54 supports the crankshaft 24 in the axial direction while still allowing the crankshaft 24 to rotate. In an embodiment, thrust bearing 54 is located between an end of the crankshaft 24 (e.g., an end of the crankshaft 24 that is opposite its eccentric end 56) and a second fixed supporting member (e.g., lower bearing housing 59).

Lubricant (e.g., oil) can be provided to the bearings 48, 50, 52, 54 along the crankshaft 24. In an embodiment, lubricant can be supplied from a lubricant sump 33 that is located in the bottom of the lower volume 34B of the scroll compressor 10. In an embodiment, the lubricant flows to the bearings 48, 50, 52, 54 by way of an interior gallery 62 located within the crankshaft 24. As shown in FIG. 2, the interior gallery 62 is not parallel with the axis of rotation of the crankshaft 24. As the interior gallery 62 is not parallel with an axis of rotation of the crankshaft 24, the centrifugal force of the rotating crankshaft 24 can be utilized to suction lubricant from the lubricant sump 33 and into the bearings 48, 50, 52, 54. However, in an embodiment, the interior gallery 62 may be parallel with the axis of rotation of the crankshaft 24.

Alternatively or additionally, scroll compressor 10 may include a pump 60 to pump oil from the lubricant sump 33 through the inner gallery 62 and into the bearings 48, 50, 52, 54. The illustrated embodiment includes three radial bearings 48, 50, 52 and a thrust bearing 54 to support the crankshaft. However, an embodiment may include one or more bearings 48, 50, 52, 54 in any specific location along the crankshaft 24. Bearings may be included as suitable to support the crankshaft 24 and allow the orbiting scroll 14 to be rotated and/or orbited correctly, relative to the fixed scroll 12.

As the gas filled volumes (e.g., trapped volume 16, trapped volume 17) are compressed between the spiral wraps 18, 20, the compressed gas exerts a force upon the scrolls 12, 14 in the axial directions. As the fixed scroll 12 cannot be easily moved due to its fixed position within the compressor 10, this axial force can push on the orbiting scroll 14 in the axial direction as shown by the arrow A in FIG. 2. This effect can also be referred to as a thrust load. It should be appreciated that the thrust load may push on the orbiting scroll 14 along one or more points along the baseplate 26 due to the various locations of gas filled volumes (e.g., trapped volume 16, trapped volume 17). The gas filled volumes apply a different amount of thrust force as they are being compressed to different pressures. The thrust load does not apply an equal amount of force across a radius of the baseplate 26 of the orbiting scroll 14.

If the thrust load is not supported, it can move the orbiting scroll 14 in the axial direction from its intermeshed position with the fixed scroll 12. If the orbiting scroll is pushed out of its position, it can also lead to inadequate sealing between the axial ends of the scrolls wraps 18, 20 and the opposing scroll baseplate 26, 13, respectively, in the axial direction. Inadequate sealing can cause a loss of efficiency of the scroll compressor 10, or in certain circumstances, the loss of the scroll compressor's 10 ability to compress the inlet gas. If the thrust force is not supported, the orbiting scroll 14 could be pushed out of position such that the orbiting scroll 14 contacts and damages the fixed supporting member (e.g., the bearing housing 58) that supports the crankshaft 24 and/or other internal components of the scroll compressor 10.

The scroll compressor 10 in an embodiment may include an aerostatic thrust bearing to support (e.g., counteract, dampen) the thrust load. The aerostatic thrust bearing supports the thrust load by supporting the orbiting scroll 14 in the axial direction. In an embodiment, the aerostatic thrust bearing includes the back surface 28 of the orbiting scroll 14, the axial surface 66 of the bearing housing 58, and a gas distributing structure 64.

In an embodiment, the source of the pressurized gas for the gas distributing structure 64 is a working fluid of the scroll compressor 10. For example, when a scroll compressor 10 is utilized to compress a refrigerant, the compressed refrigerant that is produced by the scroll compressor 10 may be utilized by the aerostatic thrust bearing to support the orbiting scroll 14.

As shown in FIG. 2, the gas distributing structure 64 is located on the axial surface 66 of the bearing housing 58. In an embodiment, the gas distributing structure 64 is fluidly connected to the upper volume 34A by a pathway 68. The pathway 68 allows the pressurized gas within the upper volume 34A to flow to the aerostatic thrust bearings 64. Accordingly, pressurized gas is supplied to the gas distributing structure 64 from the upper volume 34A.

In the illustrated embodiment of FIG. 2, the pathway 68 is shown as being completely within the external housing 22 of the scroll compressor 10. However, other embodiments may include a pathway 68 that passes through the external housing 22. For example, an embodiment of a scroll compressor 10 may include a pathway 68 that fluidly connects the discharge outlet 38 to the gas distributing structure 64 or a pathway 68 that provides pressurized gas from an external source instead of the gas compressed by the scroll compressor 10. The illustrated embodiment shows a single pathway 68 from the upper volume 34A to gas distributing structure 64. However, an embodiment may include one or more pathways 68 to the gas distributing structure 64.

As shown in FIG. 2, an optional booster 70 can be utilized to provide pressurized gas for the aerostatic thrust bearing. In an embodiment, the booster 70 is a secondary source of pressurized gas. The booster 70 provides pressurized gas when the pressure and/or flowrate of the gas being discharged by the scroll compressor 10 is not large enough to support the thrust load. For example, the booster 70 can be utilized during periods of starting and/or stopping the scroll compressor 10. In the illustrated embodiment, the booster 70 is fluidly connected to the pathway 68. However, the booster 70 in an embodiment may, alternatively or additionally, be fluidly connected to the upper volume 34A or the discharge outlet 38.

In an embodiment, the booster 70 can be, for example, a vessel containing a volume of pressured gas, which has been charged during the normal operation of the compressor 10. In an embodiment, the booster 70 may be a smaller compressor. In embodiments including a booster 70, a valve (e.g. flow control valve 71, a check valve) can be provided in the pathway 68 and/or discharge volume 40 to ensure the pressurized gas flows from the booster 70 to the gas distributing structure 64. The booster 70 is shown as being external to the scroll compressor 10. However, in an embodiment, the booster 70 may be located within the scroll compressor 10.

In an embodiment, a flow control device 71 (e.g., flow control valve) may be provided within the pathway 68. The flow control device 71 can control the amount of pressurized gas that flows to the gas distributing structure 64. Alternatively, the flow control device 71 in an embodiment may be a structure, such as the narrowing of the pathway 68, that provides a pressure drop that regulates the amount of pressurized gas that flows through the pathway 68.

In the illustrated embodiment, the booster 70 is a secondary source of pressurized gas. However, in an embodiment, the booster 70 may be a primary source of pressurized gas.

In an embodiment, the booster 70 may be an external source of pressurized gas that provides all of the pressurized gas for one or more of the aerostatic thrust bearings in a compressor 10. In such an embodiment, the pathway may connect to the booster 70 instead of the upper volume 34A.

Referring to FIGS. 2 and 3, the gas distributing structure 64 is supplied with pressurized gas from the upper volume 34A by the pathway 68. The gas distributing structure 64 distributes the pressurized gas into a space 43 between the orbiting scroll 14 and the bearing housing 58. As shown in FIG. 3, an upper surface 72 of the gas distributing structure 64 distributes the pressurized gas into the space 43. As the back surface 28 of the orbiting scroll 14 pushes on the fluid flowing through the space 43 (due to the thrust force), the distributed pressurized gas is pressed between the axial surface 66 of the bearing housing 58 and the back surface 28 of the orbiting scroll 14. As such, the flow of distributed pressurized gas forms a layer of pressurized gas between the orbiting scroll 14 and the bearing housing 58. This layer of gas can support the orbiting scroll 14 and its thrust load.

As the orbiting scroll 14 orbits, the thrust load may cause a nutation of the orbiting scroll 14 towards one radial end of the orbiting scroll 14. Nutation is the tilting of the orbiting scroll 14 relative to the crankshaft 24 and/or the bearing housing 58 (e.g., precession). When nutation occurs, the baseplate 26 is no longer perpendicular to crankshaft 24. Nutation may occur due to moments applied by compression and drive forces, as well as the inertia resulting from the orbiting of the orbiting scroll 14, and/or the thrust force being unequally applied across a diameter of the baseplate 26.

When nutation occurs, a distance (e.g., distance 39 shown in FIG. 3) between the back surface 28 of the orbiting scroll 14 and the axial surface 66 of the bearing housing 58 is no longer constant around the entire circumference of the orbiting scroll 14 and bearing housing 58. For example, the orbiting scroll 14 is tilted when viewed from a horizontal direction (e.g., the view shown in FIG. 2) such that its baseplate 26 is closer to the bearing housing 58 at one radial end and is farther apart from the bearing housing 58 at an opposite radial end. The nutation/precession would apply an additional force to further compress the layer of pressurized gas in areas where the distance between the back surface 28 and axial surface 66 is smaller. However, the compression of the layer of flowing pressurized gas causes the layer of flowing pressurized gas to provide a greater force to support the orbiting scroll 14. The layer of pressurized gas providing greater support because it provides a larger counter-force to resist further compression when the orbiting scroll 14 pushes on the layer of pressurized gas layer. In an embodiment, the orbiting scroll 14 and the bearing housing 58 are positioned, relative to each other, so that an axial distance 39 between the back surface 28 and the axial surface 66 is small. A smaller distance 39 between the back surface 28 and the axial surface 66 allows for a relatively smaller flow rate of pressurized gas to be utilized by the aerostatic thrust bearing to adequately support the orbiting scroll 14 and its thrust load.

In the manner described above, pressurized gas is supplied to the gas distributing structure 64 such that it can form a layer of pressurized gas between the orbiting scroll 14 and the bearing housing 58. The aerostatic thrust bearing utilizes the layer of pressurized gas to support the thrust load and prevent the orbiting scroll 14 from being moved out of its correct intermeshed position in the axial direction.

In the illustrated embodiment, the gas distributing structure 64 is located on the bearing housing 58. It should be appreciated that the bearing housing 56 is an example of a fixed supporting member. In an embodiment, the fixed supporting member may be other structures having a fixed location (relative to the orbiting scroll 14) and a surface that faces the back surface 28 of the orbiting scroll 14.

Figure 3A:
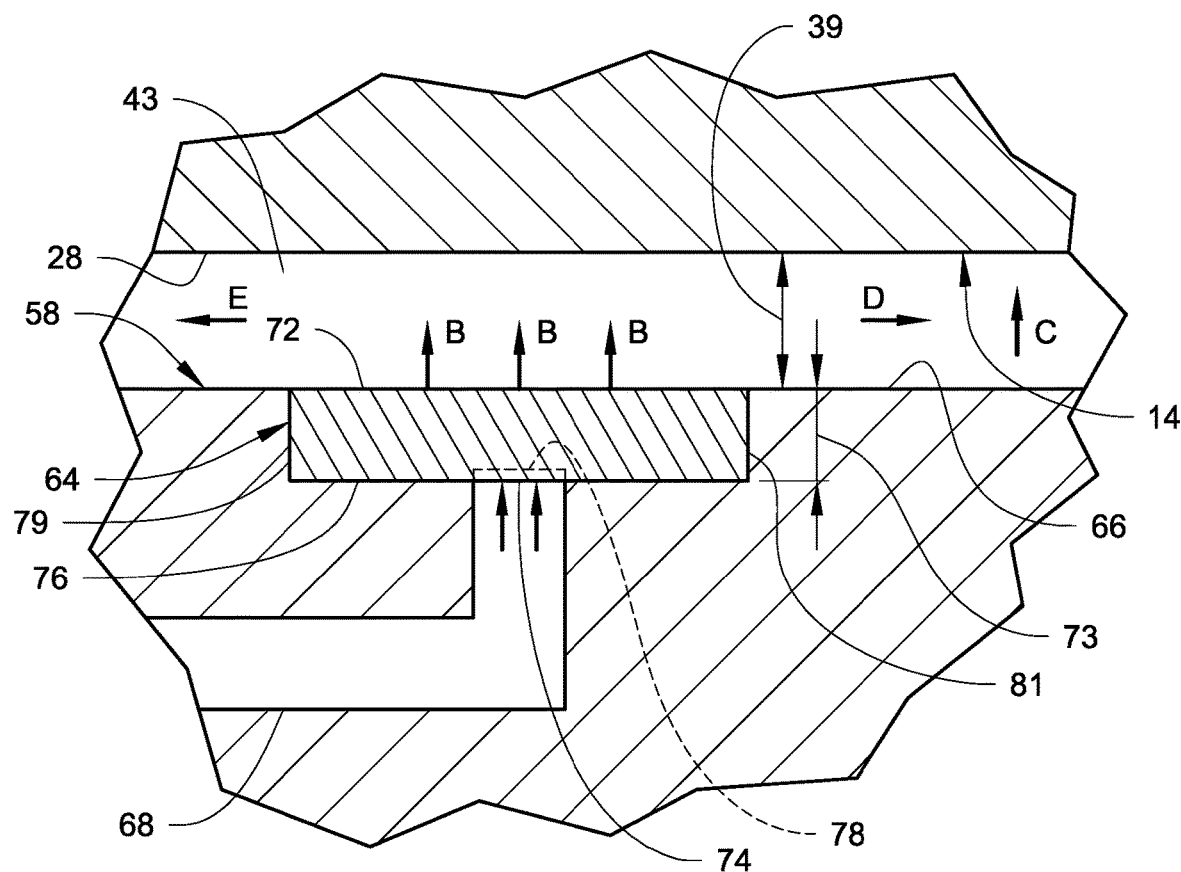
FIG. 3A shows an enlarged sectional view of the aerostatic thrust bearing in the vertical, single-stage scroll compressor shown of FIG. 2.
Figure 3B:
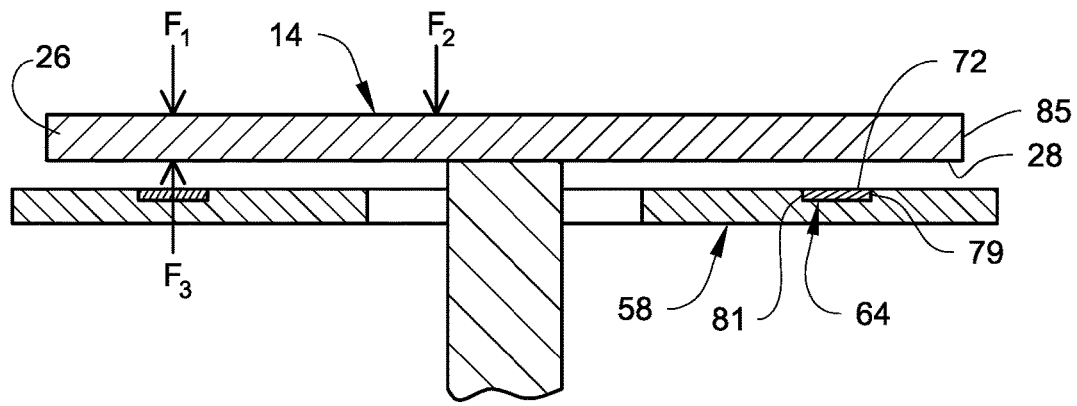
FIG. 3B shows a schematic view of the aerostatic thrust bearing in an embodiment of a scroll compressor.

FIGS. 3A and 3B show enlarged views of the aerostatic thrust bearing shown in FIG. 2, during the operation of the scroll compressor 10. As shown in FIG. 3A, the upper surface 72 of the gas distributing structure 64 distributes pressurized gas into the space 43. As shown in FIG. 3A, the gas distributing structure 64 is embedded into the axial surface 66 of the bearing housing 58. However, the gas distributing structure 64 in an embodiment may protrude from or be entirely above (e.g., located on) the axial surface 66. In an embodiment, the gas distributing structure 64 has a thickness 73 and includes an outer side 79 and an inner side 81. The illustrated embodiment has a gas distributing structure 64 with a thickness 73 that is uniform in the radial direction (e.g., along directions D and E). However, the gas distributing structure 63 in an embodiment may have a thickness 73 that is non-uniform in the radial direction.

In an embodiment, the gas distributing structure 64 may include one or more inlets 74. As shown in FIG. 3, the gas distributing structure 64 includes an inlet 74 for supplying pressurized gas. The illustrated embodiment shows the back surface 76 of the gas distributing structure 64 including the inlet 74. However, an embodiment may include an inlet 74, alternatively or additionally, in one or more of the sides 79, 81 of the gas distributing structure 64. The illustrated embodiment shows the gas distributing structure 64 having specified inlets 74. Alternatively, a surface or a portion of a surface of the gas distributing structure 64 (e.g. a back surface 76, an outer side 79, and inner side 81) may be an inlet surface for the gas distributing structure 64.

Optionally, a groove 78 that travels around all or a portion of the circumference (shown in FIG. 4) of the aerostatic thrust bearing may be provided in the gas distributing structure 64. The groove 78 may provide a pathway to distribute gas to the gas distributing structure 64. For example, the groove 78 may fluidly connect multiple inlets 74 of a gas distributing structure 64 in an embodiment. In an embodiment, the groove 78 may run along an inlet surface of the gas distributing structure 64 instead of a specific inlet 74. In such an embodiment, the groove itself may form an inlet surface. The pathway 68 may then be fluidly connected to the groove 78 to supply pressurized gas to the inlet surfaces of the gas distributing structure 64. Alternatively, the groove 78 in an embodiment may be located in the bearing housing 58 along the back surface 76 of the gas distributing structure 64.

In an embodiment, the gas distributing structure 64 is made of a material that allows gas to flow through it in a distributed manner. For example, the gas distributing structure 64 may be a porous material. In an embodiment, the gas distributing structure 64 is a porous carbon substrate. In an embodiment, the gas distributing structure 64 has a structure or material that allows the incoming pressurized gas to be distributed through its upper surface 72 (as shown by the arrows labeled B). As such, the gas distributing structure 64 can equally distribute the inlet gas along its upper surface 72 and into the space 43 between the orbiting scroll 14 and the bearing housing 58. This distribution of the gas allows the aerostatic thrust bearing to form a layer of pressurized gas that can support the thrust load of the orbiting scroll 14 in the direction of the arrow C. Once introduced into the space 43 between the orbiting scroll 14 and the bearing housing 58, the distributed pressurized gas flows in direction D and/or direction E. Some of the distributed pressurized gas may also flow in a circumferential direction (e.g., a direction along the circumference of the orbiting scroll 14, a direction that would follow the groove 72, a direction perpendicular to directions E, D, and A). However, the distributed pressurized gas flowing in a circumferential direction eventually exits from between the orbiting scroll 14 and bearing housing 58 by traveling along the radial direction (e.g., direction D, direction E).

Figure 4:
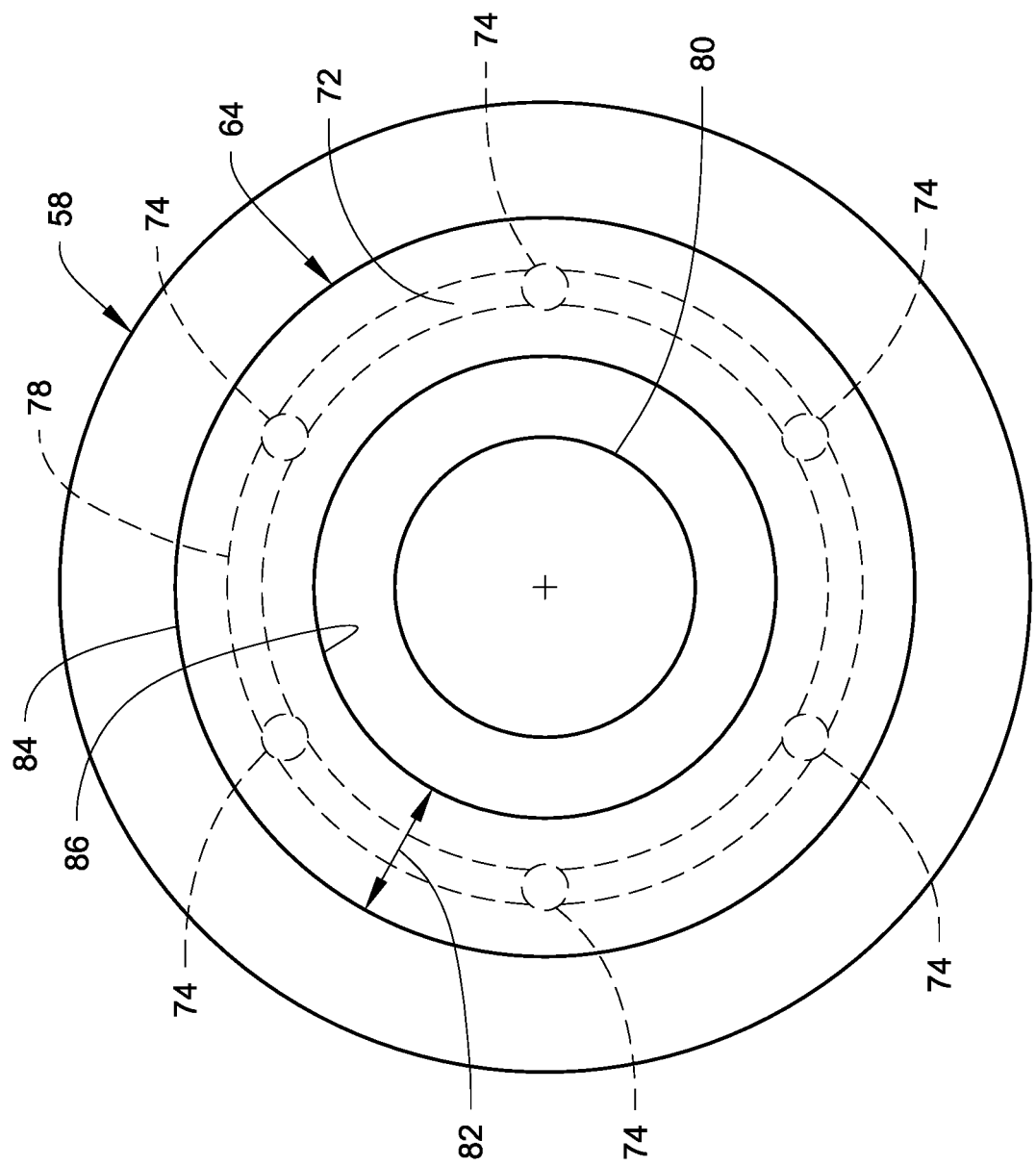
FIG. 4 shows a downward view of the bearing housing and the gas distribution structure in an embodiment of a scroll compressor.

FIG. 3B is a schematic diagram of the orbiting scroll 14 and the bearing housing 58 in an embodiment. The sides 79, 81 define the outer radius 84 and inner radius 86 (as shown in FIG. 4), respectively, of the gas distributing structure 64. In an embodiment, the outer edge 85 defines the outer circumference of the back surface 28 of the orbiting scroll 14. If the side 79 is located outside the outer circumference of the back surface 28, the upper surface 72 does not face the back surface 28 in an embodiment. This provides a bypass for pressurized gas as it may flow out of the gas distributing structure 64 without traveling through the space 43 between the orbiting scroll 14 and the bearing housing 58 (shown in FIG. 3). However, the aerostatic thrust bearing can provide greater support for the outer radius of the back surface 28 when located further outward (e.g., further towards the outer circumference of the back surface 28). Accordingly, the side 79 of the gas distributing structure 64 is positioned near, but still within, the outer circumference of the back surface 28. In such a position, the aerostatic thrust bearing provides excellent support for the radial end (e.g., the outer circumference) of the baseplate 28 of the orbiting scroll 14 while suitably and/or efficiently utilizing pressurized gas by avoiding bypass.

Further, the tilting or nutation of the orbiting scroll 14 may be further suppressed by the side 79 (and the outer radius 84) of the gas distributing structure 64 being located further outward. It will be appreciated that the gas distributing structure 64 in an embodiment has a large enough upper surface 72 to support the orbiting scroll 64 in the axial direction and to prevent the formation of large pressure gradients as discussed below.

As shown in FIG. 2, the bearing housing 58 and the orbiting scroll 14 are located in the lower volume 34B of the scroll compressor 10. As such, the space 43 (shown in FIG. 3) is fluidly connected to the lower volume 34B. In another manner, the space 43 can be defined as a specific portion of the lower volume 34B that is located between the orbiting scroll 14 and the bearing housing 58. The space 43 having a higher pressure relative to the rest of the lower volume 34B due to the flow of distributed pressurized gas. Accordingly, the pressurized gas distributed by the gas distributing structure 64, after being utilized to support the thrust load, flows from the space 43 in the direction E or D into the lower volume 34B. As such, the gas utilized by the aerostatic thrust bearing mixes with the inlet gas from the suction inlet 36, and is recompressed by the scroll compressor 10.

As shown by FIG. 4, the upper surface 72 of the gas distributing structure 64 in an embodiment has a circular ring shape in a downward view. FIG. 4 is a downward view of the bearing housing 58 and the upper surface 72 of the gas distributing structure 64. The bearing housing 58 includes a cylindrical through-hole 80 that allows the crankshaft 24 and orbiting scroll 14 to be connected. The circular ring shape allows the gas distributing structure 64 to distribute the supplied pressurized gas along an area spanning the entire circumference of the back surface 28 of the orbiting scroll 14 (shown in FIGS. 2 and 3).

As shown in FIG. 4, the upper surface 72 of the gas distributing structure 64 has an inner radius 86, an outer radius 84, and radial distance 82. In an embodiment, the upper surface 72 has a uniform shape around a circumference of the bearing housing 58. However, the upper surface 72 in an embodiment may be non-uniform around the circumference of bearing housing 58. For example, in an embodiment the radial distance 82 of the upper surface 72 and/or a distance between the through-hole 80 and the inner radius 86 may be not be constant around the circumference of the bearing housing 58.

As shown in FIG. 4, the gas distributing structure 64 includes multiple inlets 74. In an embodiment, one or more pathways 68 (shown in FIGS. 2 and 3) may fluidly connect with each inlet 74. In an embodiment, one or more pathways 68 (shown in FIGS. 2 and 3) may fluidly connect to one or more grooves (e.g., groove 78) that fluidly connects two or more of the inlets 74. The inlets 74 and groove 78 are shown as dashed lines as they would not be visible from the view shown in FIG. 4. The illustrated embodiment includes a gas distributing structure with six inlets 74. However, an embodiment may include one or more inlets 74 and/or one or more inlet surfaces as discussed herein.

As shown in FIG. 4, the groove 78 travels along the entire circumference of the gas distributing structure 64. However, in an embodiment, the groove 78 may travel along only a portion of the circumference of the gas distributing structure 64. In an embodiment, one or more grooves 78 may be provided in the gas distributing structure 64 and/or bearing housing 58. In the illustrated embodiment, the groove 78 only travels in a circumferential direction. However, in an embodiment, the groove 78 may travel in a radial direction, a circumferential direction, or a direction that is both circumferential and radial. In an embodiment, the groove 78 may have multiple portions and each portion may be oriented along a radial direction, a circumferential direction, or a direction that is both circumferential and radial. The groove 78 in the illustrated embodiment is aligned with all of the inlets 74. However, the groove 78 in an embodiment may not be perfectly aligned with the inlets 74. The groove 78 in such an embodiment may have one or more additional portions (not shown) that connect the groove 78 to the inlets 74. The additional portion(s) may travel in along the radial direction, circumferential direction, or a combination of thereof.

The upper surface 72 of the gas distributing structure 64 may have an area (A). In an embodiment and as described above, the distributed pressurized gas flows from the space 43 into the lower volume 34B. The lower volume 34B may have a pressure ($P_I$). In an embodiment, the pressure ($P_I$) of the lower volume 34B depends upon the pressure of the inlet gas to the scroll compressor 10. The pressurized gas supplied to the gas distributing structure 64 may have a pressure ($P_P$). Accordingly, in an embodiment, the amount of thrust load (F) that can be supported by aerostatic thrust can be represented as follows:

$$P_P = \left(\frac{F}{A}\right)(E_f) + P_I$$

The aerostatic thrust bearing will also have efficiency ($E_f$). The efficiency ($E_f$) is an efficiency factor that depends upon a variety of factors. For example, the factors may include the distance between the orbiting scroll 14 and the bearing housing 58, how equally the gas distributing structure 64 distributes the incoming pressurized gas across its entire upper surface 72, the thickness of the gas distributing structure 64, and the permeability of the material of the gas distributing structure 64.

The efficiency ($E_f$) may be a constant factor or a non-constant factor. For example, during stable operation, the orbiting scroll 14 may have a relatively small amount to no nutation. The efficiency ($E_f$) may be constant as the distance between the orbiting scroll 14 and the bearing housing 58 is generally constant. However, the orbiting scroll 14 may undergo nutation while operating such that the distance between the orbiting scroll 14 and the bearing housing 58 is non-constant around the circumference of the orbiting scroll 14. This may, for example, cause the efficiency ($E_f$) of the aerostatic bearing to be non-constant.

In an embodiment, a scroll compressor 10 may utilize a constant flow of inlet gas and compress the inlet gas by a minimum amount (e.g., a minimum compression ratio). Under such circumstances, a minimum pressure for the pressurized gas ($P_P$) and a maximum pressure of the inlet gas ($P_I$) in an embodiment are known. As such, a gas distributing structure 64 can be configured to have an area (A) that can support the force of thrust load (F) at the maximum pressure of the inlet gas ($P_P$) and the minimum pressure of the inlet gas ($P_I$).

In an embodiment, the gas distributing structure 64 may have a ring shape (as shown in FIG. 4) to maximize the surface area (A) of the gas distributing structure 64. Maximizing the surface area (A) of the gas distributing structure 64 may be useful, for example, when the thrust load is large and/or the pressure difference between the inlet gas and the supplied pressurized gas is small due to the inlet gas having a moderate pressure. For example, scroll compressors 10 with a higher compression ratio and/or a large plan area would generally have a larger thrust load.

For example, the pressure of the inlet gas may affect the pressure of the lower volume 34A. If the inlet gas is provided at higher pressures, the pressure difference ($P_P$–$P_I$) between the supplied pressurized gas and the lower volume 34A may be smaller. Accordingly, the gas distributing structure 64 may have an upper surface 72 with a larger surface area (A) to account for this smaller pressure difference.

An embodiment may partition the lower volume 34B. For example, the aerostatic thrust bearing in an embodiment may be isolated from the lower volume 34B by including one or more dynamic seals that are positioned between the back surface 28 of the orbiting scroll 14 and the axial surface 66 of the bearing housing 58. The one or more dynamic seals may direct the flow of the distributed pressurized gas. The lower volume 34B may have a first portion (not shown) into which the distributed pressurized gas flows (e.g., the pressurized gas in space 43 would flow into a first portion). A second portion (not shown) of the lower volume 34B may be utilized to provide the inlet gas to the inlet 41 from the suction inlet 36. The first portion would be fluidly separated from the second portion. In such an embodiment, $P_I$ in the formula above would be the pressure of the first portion of the lower volume 34B instead of the pressure based on the inlet gas. In such an embodiment, the inlet gas would no longer be a direct factor of the amount of thrust load (F) the aerostatic thrust bearing may support.

In an embodiment, an aerostatic thrust bearing that includes a gas distributing structure 64 with smaller surface area (A) may utilize a smaller flow rate of pressurized gas. The pressurized gas utilized by the aerostatic thrust bearing is gas compressed by the compressor 10 but not discharged. The energy utilized by the compressor 10 to compress the pressurized gas provided to the aerostatic thrust bearing may be considered in some circumstances a system loss. As such, a gas distributing structure 64 having a smaller surface area (A) does not provide as large of a system loss for the compressor 10. In an embodiment, a gas distributing structure having a smaller surface area (A) has less impact on the overall efficiency of the compressor 10.

The thrust load does not apply equal amounts of force across a diameter of the baseplate 28 of orbiting scroll 14. In an embodiment, the thrust force is greater towards the center of the baseplate 28 as gas is compressed to higher pressures. Referring to FIG. 3B, the thrust force $F_1$ is smaller than the thrust force $F_2$ in an embodiment. A gas distributing structure 64 that provides adequate support for the orbiting scroll 14 with a small surface area (A) can create large pressure gradients along the back surface 28. For example, the force $F_3$ applied by the distributed pressurized gas may be significantly larger than the thrust force $F_1$. The large pressure gradients can cause a deflection of the baseplate 28 and the orbiting scroll 14. Accordingly, the gas distributing structure 64 has a large enough surface area (A) to avoid forming large pressure gradients that may deflect and damage the orbiting scroll 14.

Figure 5:
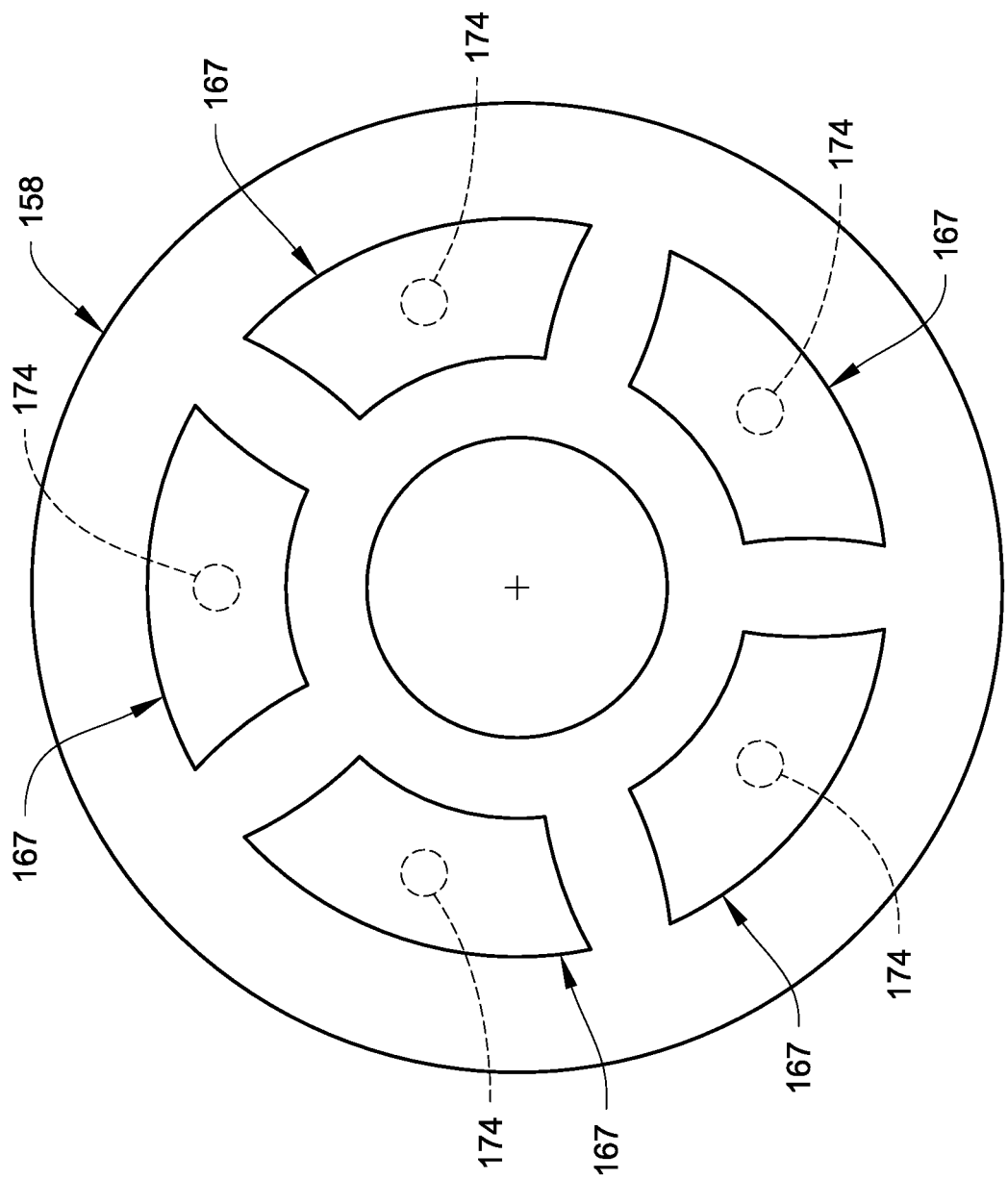
FIG. 5 shows a downward view of the bearing housing and the gas distributing structure in an embodiment of scroll compressor.

As discussed above, the orbiting scroll may undergo nutation. To account for this possible nutation and the differing thrust loads across the baseplate 26, an embodiment of an aerostatic thrust bearing can include a gas distributing structure having separate portions 167 as shown in FIG. 5. In an embodiment, the gas distributing structure may include gas distributing portions 167 that are located around the circumference of a bearing housing 158 as shown in FIG. 5. In an embodiment, each gas distributing portion 167 may have a shape that corresponds to a segment of the full ring shaped gas distributing structure 64 shown in FIG. 4. However, an embodiment may have differently shaped gas distributing portions 167 than those shown.

As shown in FIG. 5, each gas distributing portion 167 includes an inlet 174. An inlet may be similar to the inlet 74 shown and described for FIGS. 3 and 4. As pressurized gas is separately supplied to each gas distributing portion 167, the individual gas distributing portions 167 are able to separately utilize the pressurized gas. This configuration allows each gas distributing portion 167 to distribute pressurized gas without being affected by the manner in which the other gas distributing portions 167 distribute the pressurized gas.

The embodiment shown in FIG. 5 illustrates a gas distributing structure with gas distributing portions 167. However, a gas distributing structure in an embodiment may include two or more gas distributing portions 167. An embodiment of gas distributing structure may include four or more gas distributing portions 167 to account for possible differing thrust loads, axial distances 39, and/or local motions around the baseplate 28 (shown in FIG. 2) due to potential nutation of the orbiting scroll 14 (shown in FIG. 2).

For example, the nutation of the orbiting scroll may cause the axial distance (e.g., axial distance 39 shown in FIG. 3A) between the orbiting scroll 14 and housing 58 to be large at some locations around the circumference of the orbiting scroll 14. A large axial distance can allow excessive leakage of the high pressurized gas. In an embodiment of a gas distributing structure 64 without gas distributing portions 176 (e.g., the embodiment shown in FIG. 5), excessive leakage may affect the performance (e.g., reduce the load capacity) of the entire gas distributing structure 64. In contrast, the gas distributing portions 167 are independently supplied with pressurized gas such that excessive leaking of pressurized gas is less likely to affect or has a minimized affect on the performance of the other gas distributing portions 167.

Figure 6:
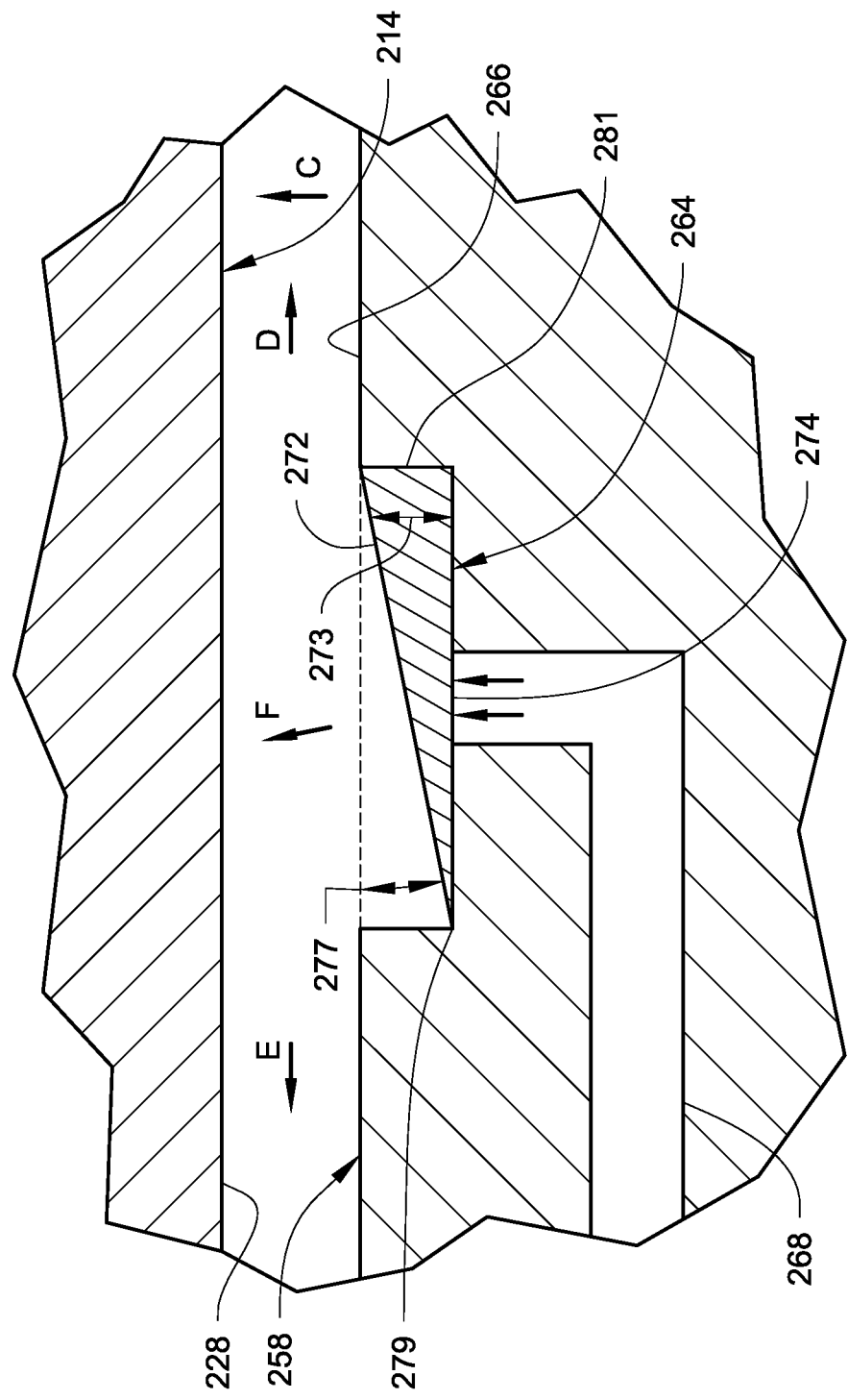
FIG. 6 shows a sectional view of an end portion of an orbiting scroll and corresponding bearing housing in an embodiment of a scroll compressor.

As shown in FIG. 6, a gas distributing structure 264 in an embodiment includes an upper surface 272 that is sloped relative to the axial surface 266 of the bearing housing 258. The gas distributing structure 264 may include features similar to the gas distributing structure 64 shown in FIG. 3, except for the upper surface 272 which has a slope 277. Similar to the gas distributing structures shown in FIGS. 2-5, the gas distributing structure 264 distributes a pressurized gas between the back surface 228 of the baseplate of the orbiting scroll 214 and the axial surface 266 of the bearing housing 258. As similarly described above for FIGS. 2-5, pressurized gas is supplied to the gas distributing structure 264 via a pathway 268.

The slope 277 of the upper surface 272 allows the pressurized gas to flow out of the gas distributing structure 264 in a different manner than the gas distributing structure 64 shown in FIG. 3. For example, the slope 277 of the upper surface 272 can affect the direction of the gas flowing out of the gas distributing structure 264. As the upper surface 272 in an embodiment is oriented in the direction of the arrow F, the gas flowing out of the gas distributing structure 264 flows in the direction of the arrow F. Further, flow of pressurized gas out of the sloped upper surface 272 can affect the manner in which the pressurized gas flows outside of the gas distributing structure 264.

Depending upon the internal structure (e.g., permeability) of the gas distributing structure 264 in an embodiment, the non-constant thickness 273 of the gas distributing structure 264 can also affect the flow rate of the gas out of the upper surface 272. For example, the pressurized gas can flow out of the gas distributing structure 264 at different rates along its upper surface 272. However, a gas distributing structure 64, 164, 264 in an embodiment may not have a constant internal structure throughout. For example, the gas distributing structure 264 may have a non-constant internal structure to ensure a more even distribution of the pressurized gas along the upper surface 272 from a central source of pressurized gas (e.g. an inlet 274).

Alternatively, a gas distributing structure (e.g., gas distributing structure 64 shown in FIG. 3) in an embodiment may be embedded into the axial surface 266 of the bearing housing 258 at an angle. In such an embodiment, the gas distributing structure can have a uniform thickness 273 while still having an upper surface 272 that has a slope 277 (relative to the axial surface 266).

An embodiment may have a different slope for the upper surface 272 than the slope 277 shown in FIG. 6. The slope 277 may be different so as to change, for example, the direction of the pressurized gas flowing out of the gas distributing structure 264, and/or the flowrate of the pressurized gas flowing out of the gas distributing structure 264. In the illustrated embodiment, the gas distributing structure 264 is thicker towards an inner side 281. However, in an embodiment, the gas distributing structure 264 may be thicker towards the outer side 279 instead of the inner side 281.

The slope 277 of the upper surface 272 may be configured so as to ensure that the outer radial end (e.g., the outer circumference) of the baseplate of the orbiting scroll 214 is adequately supported (e.g. in the direction of arrow C). The sloped upper surface 277 may support the radial end of the baseplate of the orbiting scroll 214 by directing the flow of the distributed gas. For example, the configuration of the slope 277 of the upper surface 272 in an embodiment may provide a larger quantity of pressurized gas in the direction E than the direction D. In such an embodiment, the larger flow of gas in the direction of the outer radius of the baseplate of the orbiting scroll 214 (e.g., direction E) may better support the radial end of the baseplate.

In an embodiment, the upper surface 72, 272 of the gas distributing structure 64, 264 may be sloped in the circumferential direction (e.g., along circumference of the baseplate 26, along the circumference of the baseplate of the orbiting scroll 214). In an embodiment, the slope of the upper surface 72, 264 in the circumferential direction may be non-constant. For example, the upper surface 72, 272 may include a downward sloped portion and an upward slopped portion so as to form grooves in the upper surface 72, 272. In an embodiment, these grooves in the upper surface 27,272 may be formed along a radial direction.

The friction between the back surface 228 and the flowing pressurized gas can push pressurized gas in the direction of the orbit of the orbiting scroll 14. In an embodiment, the upper surface 272 of the gas distributing structure 264 may utilize the pressurized gas pushed by the orbiting scroll 14 to form areas of higher relative pressures. For example, these areas of high relative pressures may be referred to as a pressurized gas wedge. The slope of the upper surface 272 may be in the circumferential direction and/or radial direction (as shown in FIG. 6) so as to form pressurized gas wedges in specific locations. The slope of the upper surface 72, 272 may not be constant as the orbit of the orbiting scroll 14. These area or areas of gas with higher relative pressures may enhance the amount of support provided by the aerostatic thrust bearing.

The gas distributing structures 64, 264 are shown as being entirely below the axial surface 66, 266 of the bearing housing 58, 258. However, the gas distributing structure 64, 264 in an embodiment may protrude above the axial surface 66 or be entirely above (e.g., located on) the axial surface 66, 266 of the bearing housing 58, 258.

Figure 7:
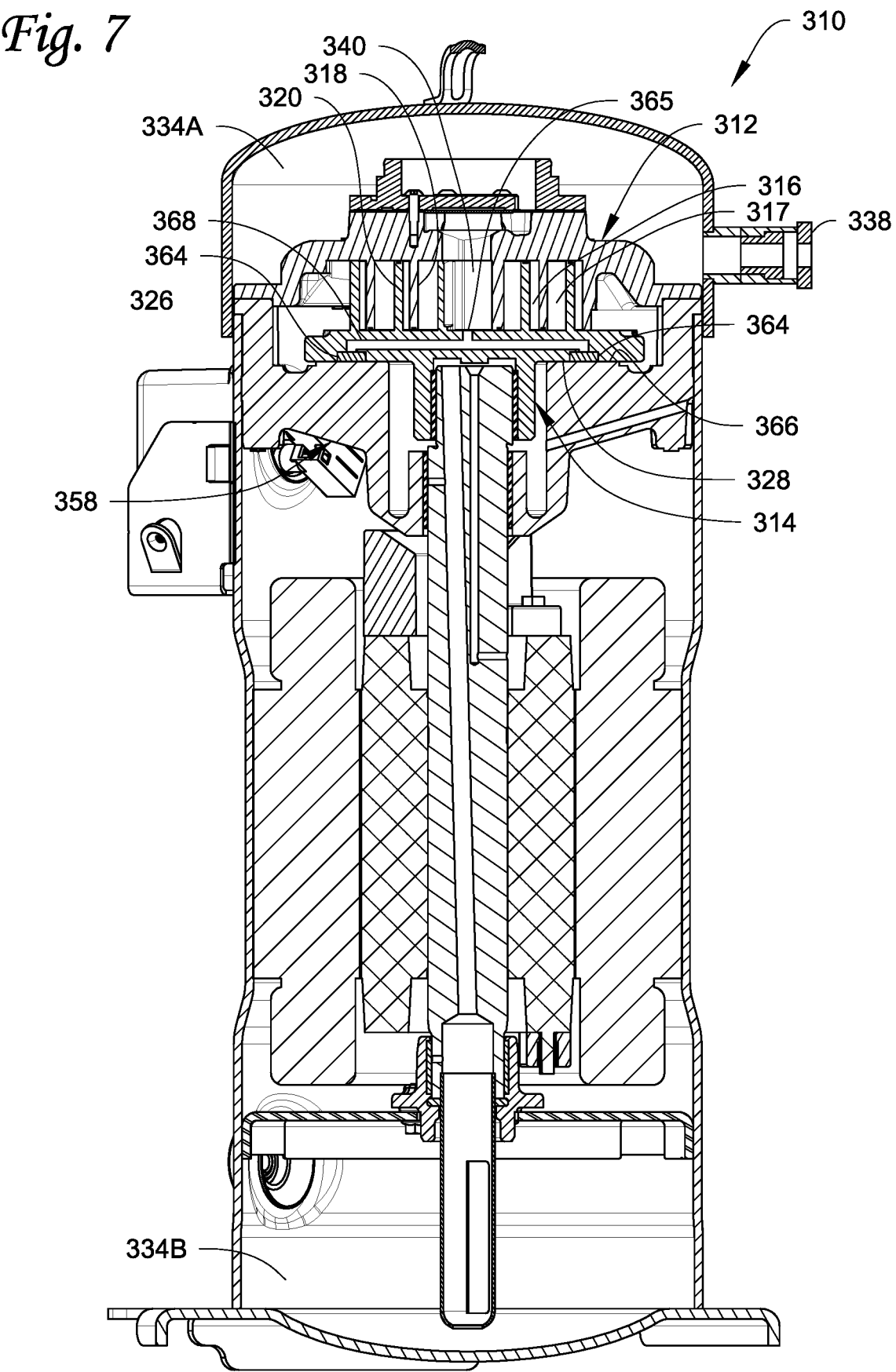
FIG. 7 shows a cross sectional view of an embodiment of a vertical, single-stage scroll compressor including an aerostatic thrust bearing including a gas distributing structure in an orbiting scroll.

As shown in FIG. 7, a scroll compressor 310 in an embodiment has an aerostatic thrust bearing that includes a gas distributing structure 364 located on a back surface 328 of the orbiting scroll 314. The scroll compressor 310 also includes a fixed scroll 312 with a spiral wrap 318, similar to the scroll compressor 10 shown in FIG. 2. The orbiting scroll 314 also includes a spiral wrap 320. The fixed scroll 312 and orbiting scroll 314 and their respective spiral wraps are intermeshed similar to the compressor 10 shown in FIG. 2 and described above. A coupling device (e.g., Oldham coupling 30) has been omitted from the view shown in FIG. 7 for ease of understanding.

In an embodiment, the aerostatic thrust bearing includes the back surface 328 of the orbiting scroll 314, an axial surface 366 of the bearing housing 358, and the gas distributing structure 364. The gas distributing structure 364 of the aerostatic thrust bearing is located on the back surface 328 of the baseplate 326 of the orbiting scroll 314. The scroll compressor 310 may have similar features to the scroll compressor 10 shown in FIG. 2 and described above, except as described herein. In an embodiment, the gas distributing structure 364 may include features similar to the gas distributing structures 64, 164, 264 shown in FIGS. 2-6. For example, the gas distributing structure 364 may have separated portions and/or a sloped upper surface.

In a similar manner to the gas distributing structures 64, 164, 264 shown in FIGS. 2-6, the gas distributing structure 364 distributes a pressurized gas between the back surface 328 of the orbiting scroll 314 and the axial surface 366 of the bearing housing 358. As similarly described above, the distributed pressurized gas then flows into the lower volume 334B of the scroll compressor 310. The flowing distributed pressurized gas is formed into a layer between the orbiting scroll 314 and the bearing housing 358 by the surfaces of the aerostatic thrust bearing. The layer supports the orbiting scroll in the axial direction as similarly described above. In this manner, the aerostatic thrust bearing may support the orbiting scroll 314 and its thrust load such that the orbiting scroll 314 does not move out of its correct intermeshed position with the fixed scroll 312 in the axial direction.

In an embodiment, the gas distributing structure 364 is supplied with a pressurized gas from a discharge volume 340 of the spiral wraps 318, 320. The discharge volume 340 shown in FIG. 7 may have a similar configuration to the discharge volume 40 described above for FIG. 2, except that the discharge volume 340 also includes a secondary outlet 365. A passageway 368 in the baseplate 326 of the orbiting scroll 314 fluidly connects the discharge volume 340 to the gas distributing structure 364 via the secondary outlet 365. In such a manner, pressurized gas is supplied to the aerostatic thrust bearing from the discharge volume 340 through the baseplate 326 of the orbiting scroll 314.

In an embodiment, the inlet (e.g. the secondary outlet 365) for the passageway 368 can be located at a different radial location of the baseplate 326. In such an embodiment, the passageway 365 may fluidly connect the gas distributing structure 364 to an intermediate volume (e.g., trapped volume 316, trapped volume 317) of the scrolls 312, 314. Accordingly, the discharge volume 340 in such an embodiment may or may not have the secondary outlet 365.

The inlet for the passageway 368 in an embodiment may be located on the outer radial surface of baseplate 326. In such an embodiment, pressurized gas from an internal source (e.g., upper volume 334A) or an external source (e.g. a booster, not shown) could supply the gas distributing structure 364 with pressurized gas via the outer radial surface of the baseplate 326 instead of the discharge volume 340.

In an embodiment, the pressure drop across the aerostatic thrust bearing may control the amount of pressurized gas that flows through the aerostatic thrust bearing. However, the passageway 368 in an embodiment may include one or more flow control mechanisms (e.g., narrowing of the passageway 368, a flow control valve (e.g, flow control valve 71) to prevent more than the desired amount of pressurized gas from flowing through the aerostatic thrust bearing.

In an embodiment, the passageway 368 can include portions, and each portion can fluidly connect the passageway 368 to different locations along the circumference of the gas distribution structure 364. Alternatively or additionally, the passageway 368 may be fluidly connected to a groove (e.g., a groove similar to the groove 78) that fluidly connects one or more inlets (e.g., similar to inlets 74, 174, 274) of the gas distributing structure 364. As similarly described above, the gas distributing structure 364 in an embodiment may be a continuous ring (e.g., gas distributing structure 64) or it may have separate sections or portions (e.g., the gas distributing portions 167). In an embodiment, the upper surface of the gas distributing structure 364 (e.g. the surface of the gas distributing structure 364 facing the bearing housing 358) may be sloped relative to the back surface 328 of the orbiting scroll 314, in a similar manner to the gas distributing structure 264 in FIG. 6.

During normal operation, the gas distributing structure 364 distributes pressurized gas between the bearing housing 358 and the orbiting scroll 314. As similarly described above, the distributed pressurized gas flows from between the orbiting scroll 314 and the bearing housing 358 into a lower volume 334B of the scroll compressor 310. The distributed pressurized gas is pressed between the axial surface 366 and the back surface 328 such that it forms a layer of flowing pressurized gas between the bearing housing 358 and the orbiting scroll 314. This layer of flowing pressurized gas supports the orbiting scroll 314 in the axial direction and the thrust load produced by the scrolls 312, 314. In such a manner, the aerostatic thrust bearing supports the orbiting scroll 314 and its thrust load. During normal operation, the aerostatic thrust bearing ensures that the orbiting scroll 314 stays in its correct intermeshed position with the fixed scroll 312 in the axial direction.

In an embodiment, a booster (e.g., booster 70 in FIG. 2) may be included to supply pressurized gas to the aerostatic thrust bearing. The booster may be a secondary source of pressurized gas for the aerostatic thrust bearing. The booster may provide pressurized gas, for example, when there is inadequate pressurized gas to support the thrust load (e.g., during the startup of the compressor, during the shutdown of the compressor). In an embodiment, the booster may be fluidly connected to gas distributing structure 364 by way of, for example, the discharge volume 340, a radial surface of the baseplate 326, an upper volume 334A, and/or the discharge outlet 338.

Figure 8:
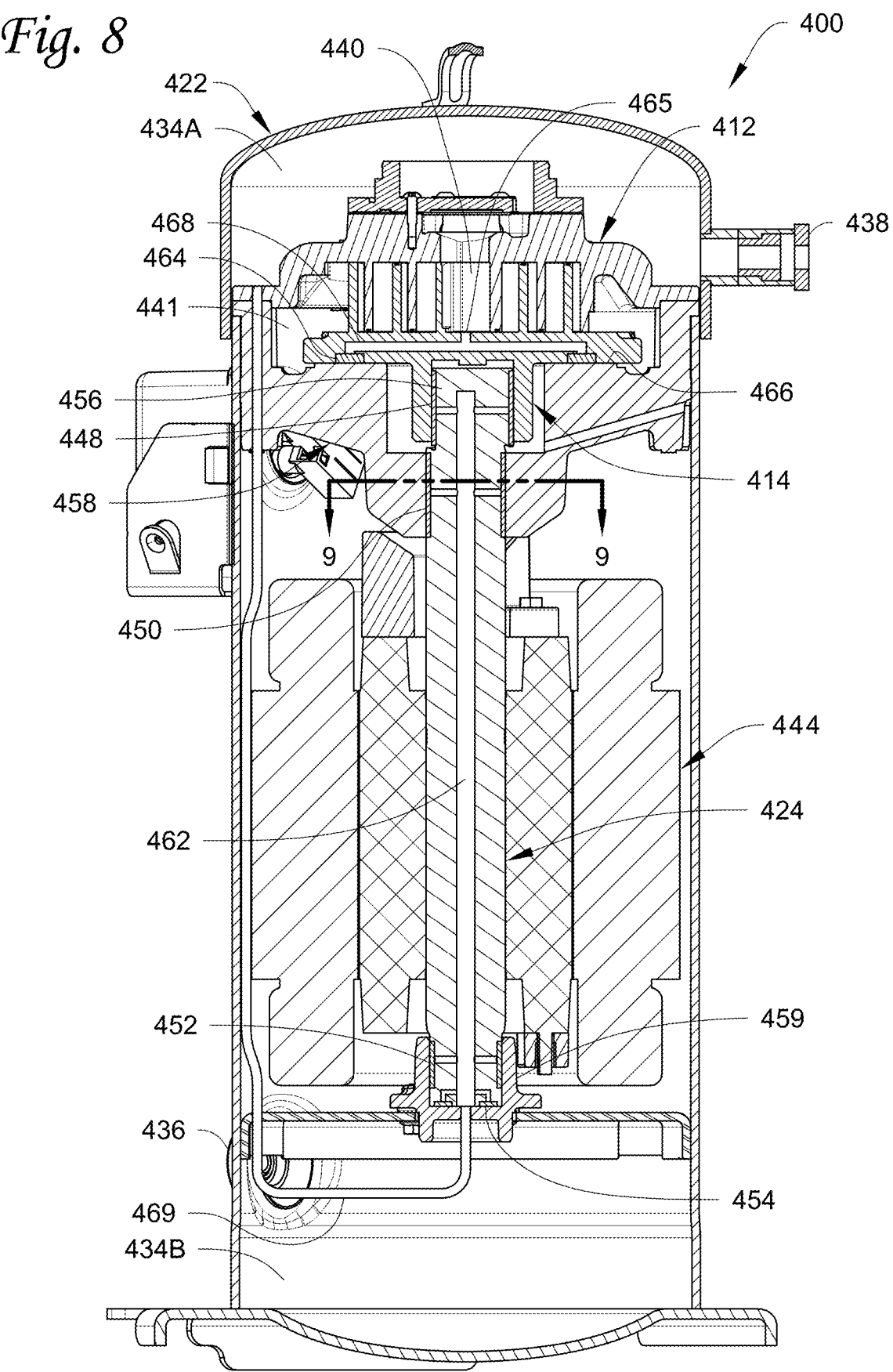
FIG. 8 shows a cross sectional view of an embodiment of an oil-free, vertical, single-stage scroll compressor including aerostatic bearings in the orbiting scroll and the crankshaft.

A scroll compressor in an embodiment may be oil-free scroll compressor 400 as shown in FIG. 8. The scroll compressor 400 shown in FIG. 8 is a vertical, single-stage, scroll compressor. FIG. 8 is a cross-sectional view of the oil-free scroll compressor 400. An oil-free scroll compressor 400 includes aerostatic thrust bearings and aerostatic radial bearings. Pressurized gas is supplied to the aerostatic bearings. In an embodiment, the pressurized gas may be a refrigerant that has been compressed by the scroll compressor 400. A coupling device (e.g., Oldham coupling 30) has been omitted from the view shown in FIG. 11 for ease of understanding. However, in an embodiment, it should be appreciated that an additional aerostatic bearing or gas distributing structure may be provided for a coupling device that requires lubrication in an embodiment of an oil-free scroll compressor 400. The gas distributing structure for the coupling device may be located in the orbiting scroll 414 and/or the bearing housing 458.

In an embodiment of an oil-free scroll compressor 400, the orbiting scroll 414 and its thrust load may be supported in the axial direction by an aerostatic thrust bearing. The aerostatic thrust bearing includes a gas distributing structure 464. Similar to the scroll compressor 310 shown in FIG. 7 and as described above, the gas distributing structure 464 is located on the orbiting scroll 414 and is supplied pressurized gas from a discharge volume 440 of the scrolls 412, 414 by a passageway 468. In an embodiment, a secondary inlet 465 for the passageway 468 may be located at another radial location of the orbiting scroll 414 as similarly described above for FIG. 7. In an embodiment, the aerostatic thrust bearing in an embodiment may have the gas distributing structure 464 on the axial surface 466 of the bearing housing 458, similarly to the gas distributing structures 64, 164, 264 shown in FIGS. 2-6.

For example, an electric motor 444 (similar to the electric motor 44 described above for FIG. 2) is included in the scroll compressor 400 to rotate the crankshaft 424. The scroll compressor 400 includes aerostatic radial bearings for supporting the crankshaft 424 in the radial direction and a crankshaft aerostatic thrust bearing for supporting the crankshaft 424 in the axial direction. The scroll compressor 400 also includes an aerostatic radial bearing located between an end of the crankshaft 424 (e.g. an eccentric end 456) and the orbiting scroll 414. In an embodiment, each aerostatic bearing along the crankshaft includes a gas distributing structure 448, 450, 452, 454 located on the crankshaft 424.

A first radial bearing and second radial bearing support the crankshaft 424 in the radial direction while it rotates. A first aerostatic radial bearing includes a radial surface of the crankshaft 424, a radial surface of the bearing housing 458 (e.g., a surface of the bearing housing facing the radial surface of the crankshaft 424), and the gas distributing structure 450. The first radial bearing is described in more detail below for FIG. 9. As shown in FIG. 8, a second aerostatic radial bearing includes a radial surface of the crankshaft 424, a radial surface of a lower bearing housing 459 (e.g. a surface of the lower bearing housing 459 that faces the radial surface of the crankshaft 424), and the gas distributing structure 452.

The crankshaft aerostatic thrust bearing supports the crankshaft 424 in the axial direction while it rotates. The crankshaft aerostatic thrust bearing is located at an axial surface of an end of the crankshaft 424 opposite of the eccentric end 456. The crankshaft aerostatic thrust bearing includes the axial surface of an end of the crankshaft 424, an axial surface of the lower bearing housing 459, and the gas distributing structure 454. The crankshaft thrust bearing is described in more detail below regarding FIG. 10A.

The scroll compressor 400 also includes the aerostatic radial bearing for the eccentric end 456 of the crankshaft 424 that engages with the orbiting scroll 414. In an embodiment, the aerostatic radial bearing for the eccentric end 456, with the coupling device, allows the eccentric end 456 to transfer its radial movement without transferring its rotation to the orbiting scroll 414. The aerostatic radial bearing for the eccentric end 456 includes a radial surface of the eccentric end 456 of the crankshaft 424, a surface of the orbiting scroll 414 (e.g. a surface of orbiting scroll 414 that faces the radial surface of the eccentric end 456), and the gas distribution structure 448 located on the surface of the eccentric end 456.

Similar to the scroll compressors 10, 310 shown in FIGS. 2 and 7, a lower volume 434B of the scroll compressor 400 is fluidly separated from an upper volume 434A, and an inlet 441 of the intermeshed scroll 412, 414 is located in the lower volume 434B. As such, the gas within the lower volume 434B is supplied to the scrolls 412, 414 for compression. Inlet gas is supplied to the lower volume 434B by a suction inlet 436. As shown in FIG. 8, the aerostatic bearings of the scroll compressor 400 (and their respective gas distributing structures 448, 450, 452, 454, 464) are located in the lower volume 434B of the scroll compressor 400. Accordingly, the pressurized gas distributed by the gas distributing structures 448, 450, 452, 454, 464 flows into the lower volume 434B and can mix with the inlet gas in the lower volume 434B. In such a manner, the pressurized gas utilized by the aerostatic bearings is recompressed. As the pressurized gas and the inlet gas are the same type of gas (e.g., a refrigerant) in an embodiment, the pressurized gas distributed by the gas distributing structures 448, 450, 452, 454, 464 does not have to be separated from the inlet gas. As discussed above, in an embodiment, the lower volume 334B may be partitioned such that the gas utilized by the aerostatic bearings and the inlet gas do not mix.

As shown in FIG. 8, the crankshaft 424 has interior gallery 462 that travels through most of the length of the crankshaft 424. The gas distributing structures 448, 450, 452, 454 located along the crankshaft 424 are fluidly connected to the interior gallery 462 of the crankshaft 424. In an embodiment, a connecting passageway 469 fluidly connects the interior gallery 462 to the upper volume 434A of the scroll compressor 400. As similarly described above for FIGS. 2-7, the upper volume 434A in an embodiment is fluidly connected to the discharge volume 440 of the scrolls 412, 414. Accordingly, the pressurized gas supplied to the gas distributing structures 448, 450, 452, 454 along the crankshaft 424 is the gas compressed by the scroll compressor 400.

In the embodiment illustrated in FIG. 8, the connecting passageway 469 is entirely within the external housing 422 of the scroll compressor 400. However, an embodiment may have a connecting passageway 469 that passes through the external housing 422. In such embodiments, a source of pressurized gas for the aerostatic bearings on the crankshaft 424 may be an external source (e.g., a separate compressor, a booster), or the discharge outlet 438 of the scroll compressor 400. In an embodiment, the connecting passageway 469 may include a flow control device (e.g., the flow control device 71 shown in FIG. 2) to control and/or stop the flow of gas to the gas distributing structures 448, 450, 452, 454.

In an embodiment, the scroll compressor may be a multistage scroll compressor that has orbiting scrolls 414 located on both ends of the crankshaft 424. In such an embodiment, the connecting passageway 469 may be fluidly connected to the interior gallery 462, for example, through a radial surface of the crankshaft 424 instead of the end of the crankshaft 424. Additionally, a scroll compressor may include a booster (e.g., booster 70) as described herein. The booster may be external or internal to the scroll compressor 400 in an embodiment. In an embodiment, the booster may be a primary source of pressurized gas as described above. Further, the booster in an embodiment may be a primary source of pressurized gas for one or more of the aerostatic bearings in the oil-free scroll compressor 400.

Figure 9:
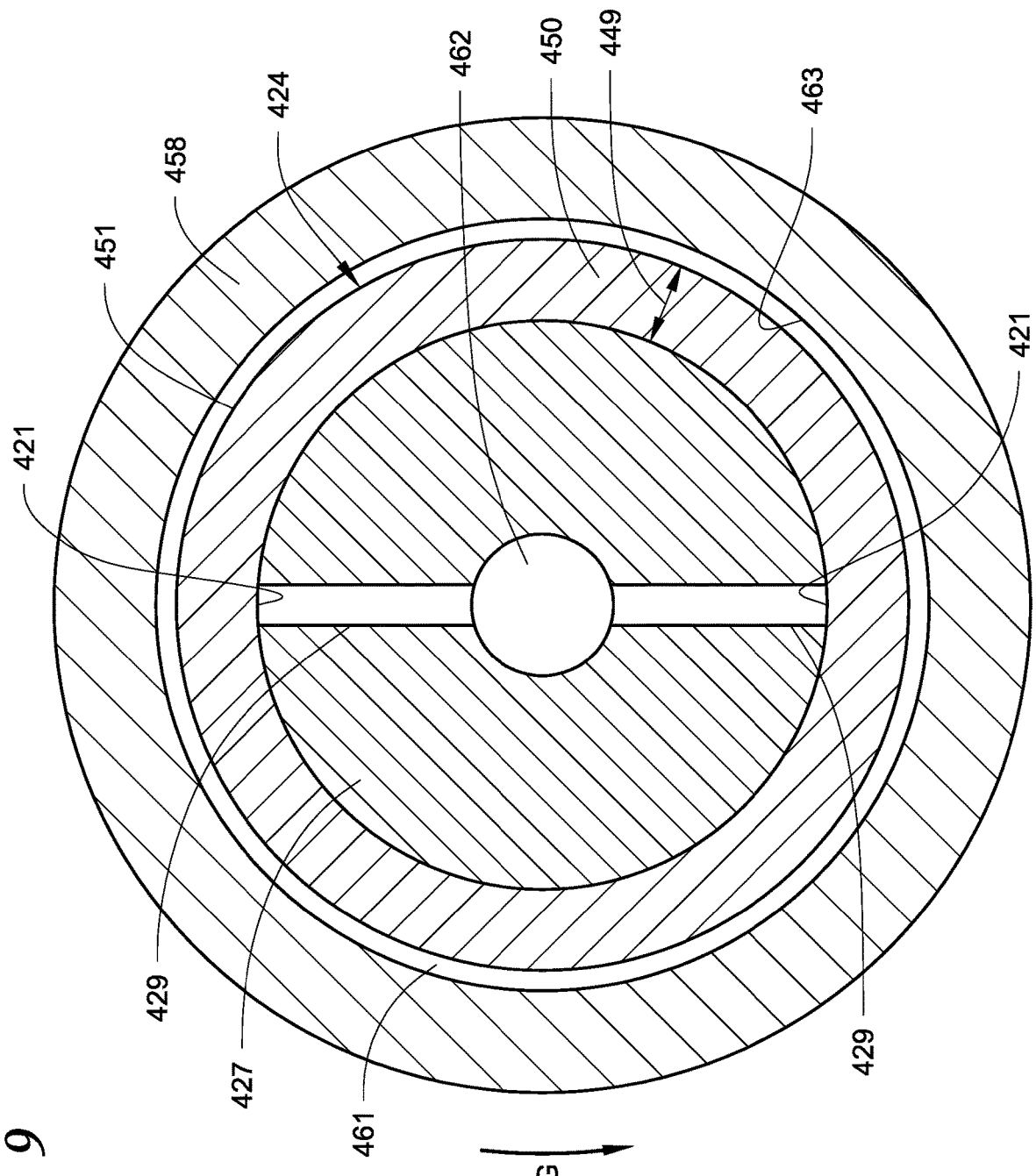
FIG. 9 shows a partial cross sectional view of an aerostatic radial bearing from the view 9-9 of FIG. 8.

FIG. 9 is a partial cross-sectional view of one of the aerostatic radial bearings of the scroll compressor 400 from the line 9-9 shown in FIG. 8. The aerostatic radial bearing includes the outer surface 451 of the crankshaft 424, the radial surface 463 of the bearing housing 458, and the gas distributing structure 450.

As shown in FIG. 9, the gas distributing structure 450 forms the entire outer surface 451 of the crankshaft 424 near the bearing housing 458. As such, the crankshaft 424 and the gas distributing structure 450 have the same outer surface 451. However, the gas distributing structure 450 in an embodiment may not form the entire outer surface of the crankshaft 424. For example, the gas distributing structure 450 in an embodiment, when viewed in an axial direction (e.g., the view shown in FIG. 9), may have portions along the circumference of the crankshaft 424 (e.g. along the direction G), and the portions of the gas distributing structure 450 may not contact each other. In an embodiment, the gas distributing structure 450 may have multiple portions along the axial direction of the crankshaft 424, along the circumference of the crankshaft 424, or both.

As shown in FIG. 9, pathways 429 fluidly connect the interior gallery 462 of the crankshaft 424 to the gas distributing structure 450. As such, pressurized gas is supplied to the aerostatic radial bearing from the internal gallery 462. During normal operation of the scroll compressor 400, the gas distributing structure 450 distributes the supplied pressurized gas along its outer surface 451. The distributed pressurized gas is then pressed between the surfaces of the aerostatic radial bearing such that a layer of flowing pressurized gas is formed in the space 461 between the crankshaft 424 and the bearing housing 458. In an embodiment, this layer of flowing pressurized gas supports the crankshaft 424 as it rotates, which prevents the crankshaft 424 from contacting the bearing housing 458 as the crankshaft 424 is rotated.

In the illustrated embodiment, the crankshaft 424 has two pathways 429. However, an embodiment may include one or more pathways 429 as may be suitable to adequately supply pressurized gas to the gas distributing structure 450 such that the aerostatic radial bearing can support the crankshaft 424 as it rotates. In embodiments with a gas distributing structure 450 having multiple portions (not shown), a pathway 429 may be provided for each portion.

The crankshaft 424 and/or the aerostatic radial bearing 450 may include one or more grooves (not shown) in its surface. In an embodiment, the one or more groove or grooves may be located along the radial surface and through an interior part 427 of the crankshaft 424 that faces the inner radial surface of the aerostatic radial bearing. A groove or grooves may travel along the axial direction of the crankshaft 424, circumferential direction of the crankshaft 424 (e.g. along the direction G), or both. As similarly discuss above regarding the gas distributing structure 64, 164, 264 in FIGS. 2-6, the gas distributing structure 450 may have one or more inlets 421 or inlet surfaces. A groove may allow pressurized gas to be supplied to the one or more inlets 421 or inlet surfaces of the gas distributing structure 450 without requiring additional pathways 429. In embodiments of gas distributing structure 450 having multiple portions (not shown), a groove may fluidly connect two or more of the inlet(s) 421 and/or inlet surface(s) of each portion.

In the illustrated embodiment, the gas distributing structure 450 has a uniform thickness 449. However, a gas distributing structure 450 in an embodiment may have a non-uniform thickness 449. In an embodiment, the other aerostatic radial bearings along the crankshaft, which may include each include a gas distributing structure 448, 452, may have a structure similar to the first aerostatic radial bearing shown in FIG. 9. In an embodiment, other aerostatic radial bearings may include a different surface that faces that radial surface of the crankshaft (e.g., axial surface of the lower bearing housing 459, a surface of the orbiting scroll 414).

Figure 10A:
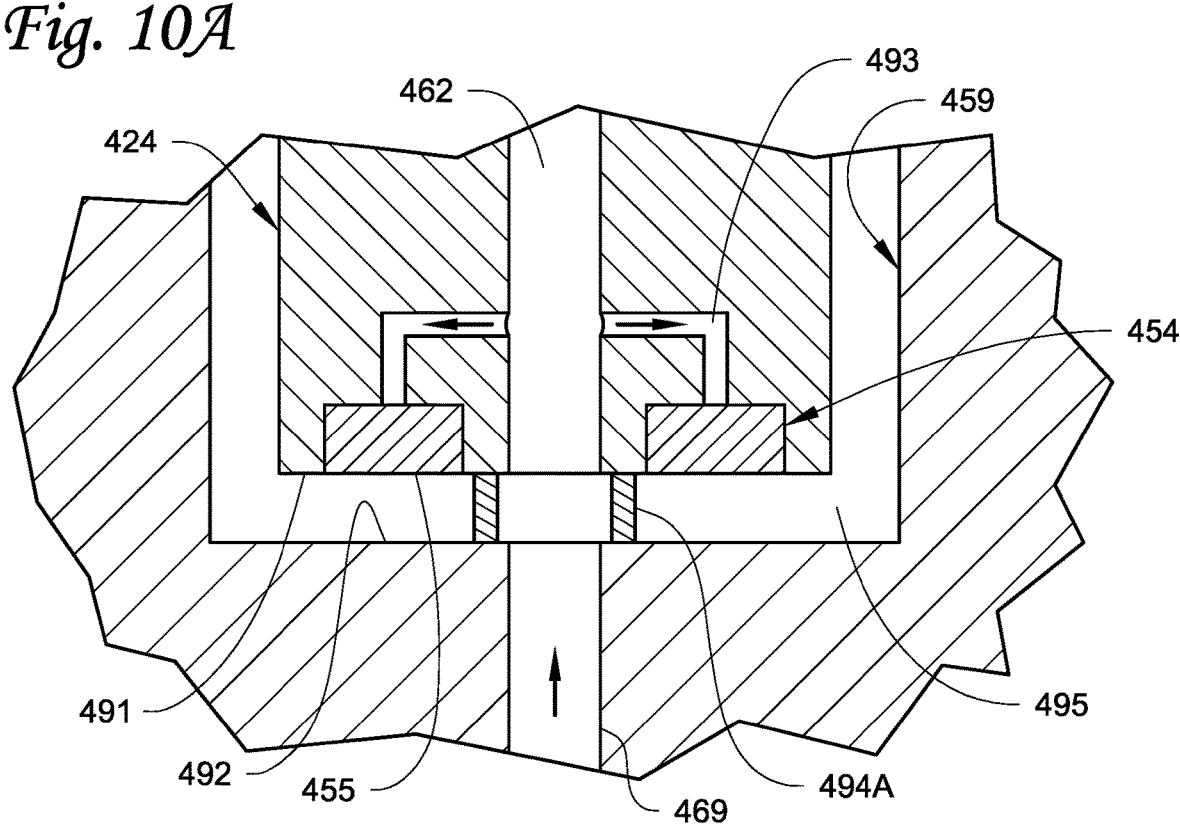
FIG. 10A shows an enlarged view of the crankshaft aerostatic thrust bearing of FIG. 8 including an embodiment of an axial dynamic seal.

An enlarged, partial view of the crankshaft aerostatic thrust bearing of the oil-free scroll compressor 400 of FIG. 9 during its normal operation is shown in FIG. 10A. The crankshaft aerostatic thrust bearing includes an axial surface 491 of the crankshaft 424, an axial surface 492 of the lower bearing housing 459, and a gas distributing structure 454. In an embodiment, two pathways 493 in the crankshaft 424 fluidly connect the gas distributing structure 454 to the interior gallery 462. As shown in FIG. 8, the pathway 469 in an embodiment fluidly connects the upper volume 434A of the scroll compressor 400 to the interior gallery 462. As such, the gas distributing structure 454 is fluidly connected to upper volume 434A of the scroll compressor 400.

During operation of the scroll compressor 400, pressurized gas from the upper volume 434A is supplied to the gas distributing structure 454. As similarly described above, the gas distributing structure 454 has a configuration and/or composition (e.g., material properties, internal configuration) such that it distributes the supplied pressurized gas along its outer surface 455. Accordingly, the gas distributing structure 454 more equally distributes the supplied pressurized gas into the space 495 between the axial surface 491 of the crankshaft 424 and the axial surface 492 of the lower bearing housing 459. The distribution of pressurized gas allows the crankshaft aerostatic thrust bearing to form a layer of flowing pressurized gas in the space 495. This layer of flowing pressurized gas supports the crankshaft 424 in the axial direction as it rotates.

As shown in FIG. 10A, a dynamic seal 494A is provided between the axial surface 491 of the crankshaft 424 and the axial surface 492 of the bearing housing 459. The dynamic seal 494A can direct the pressurized gas flowing from the pathway 469 into the internal gallery 462. The dynamic seal 494A in an embodiment prevents the pressurized gas provided by the passageway 469 from bypassing the interior gallery 462. The dynamic seal 494A can be made of a material that allows it easily to contract and expand. This allows the dynamic seal 494A to provide a seal between the axial surfaces 491, 492 even if the crankshaft 424 and lower bearing housing 459 shift relative to each other in the axial direction.

Figure 10B:
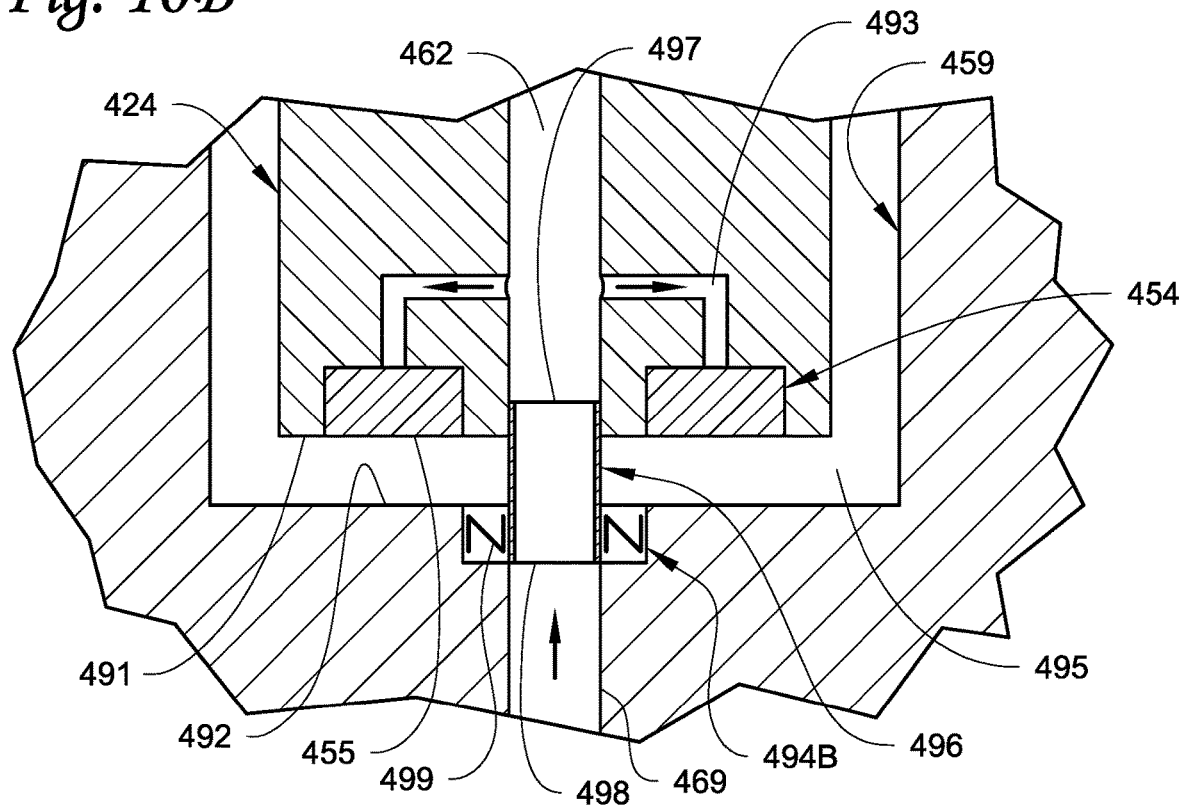
FIG. 10B shows an enlarged view of the crankshaft aerostatic thrust bearing of FIG. 8 including an embodiment of a radial dynamic seal.

As shown in FIG. 10B, a radial dynamic seal 494B may be provided in an embodiment instead of or in addition to the axial dynamic seal 494A. A rigid member 496 such as a tube may be provided with the radial dynamic seal 494B. The rigid member 496 fluidly connects the connecting passageway 469 and the internal gallery 462 in an embodiment. An end 497 of the rigid member 496 is press fit into the bore forming the interior gallery 462. The end 497 is fit into the interior gallery 462 such that the rigid member 496 is in a fixed position relative to the crankshaft 424. Accordingly, the rigid member 496 rotates with the crankshaft 424. The radial dynamic seal 494B is positioned around the connecting passageway 469. The radial dynamic seal 494B forms a last portion of the connecting passageway 469 in an embodiment. The opposite end 498 of the rigid tube 494 is fit into the radial dynamic seal 494B. The radial dynamic seal 494B provides a seal between the lower bearing housing 459 and an outer radial surface of the opposite end 498 of the rigid member 496. The radial dynamic seal 494B provides sealing such that the pressurized gas flowing through the connecting passageway 469 flows through the rigid member and into the interior gallery 462. As shown in FIG. 10B, the radial dynamic seal 494B may also include a spring 499. The spring 499 may bias the radial dynamic seal 494B against the outer surface of the rigid member 496 to improve sealing.

In the illustrated embodiment, the crankshaft 424 includes two pathways 493 for the gas distributing structure 454 to distribute pressurized gas into the space 495. However, the crankshaft 424 in an embodiment may include one or more pathways 493 for supplying pressurized fluid to the gas distributing structure 454. It should be understood that the gas distributing structure 454 may have a features similar to the gas distributing structures 64, 164, 264 discussed above in FIGS. 3-6. For example, the gas distributing structure 454 may have separate portions and/or a sloped outer surface 455 relative to the axial surface 491 of the crankshaft 424. As shown in FIG. 10A, the gas distributing structure 454 is embedded into the crankshaft 424 such that the outer surface 455 of the gas distributing structure 454 and the axial surface 491 of the crankshaft 424 form a flat surface. However, the gas distributing structure 454 in an embodiment may protrude from the axial surface 491. In an embodiment, the entirety of the gas distributing structure 454 may be above the axial surface 491.

Figure 11:
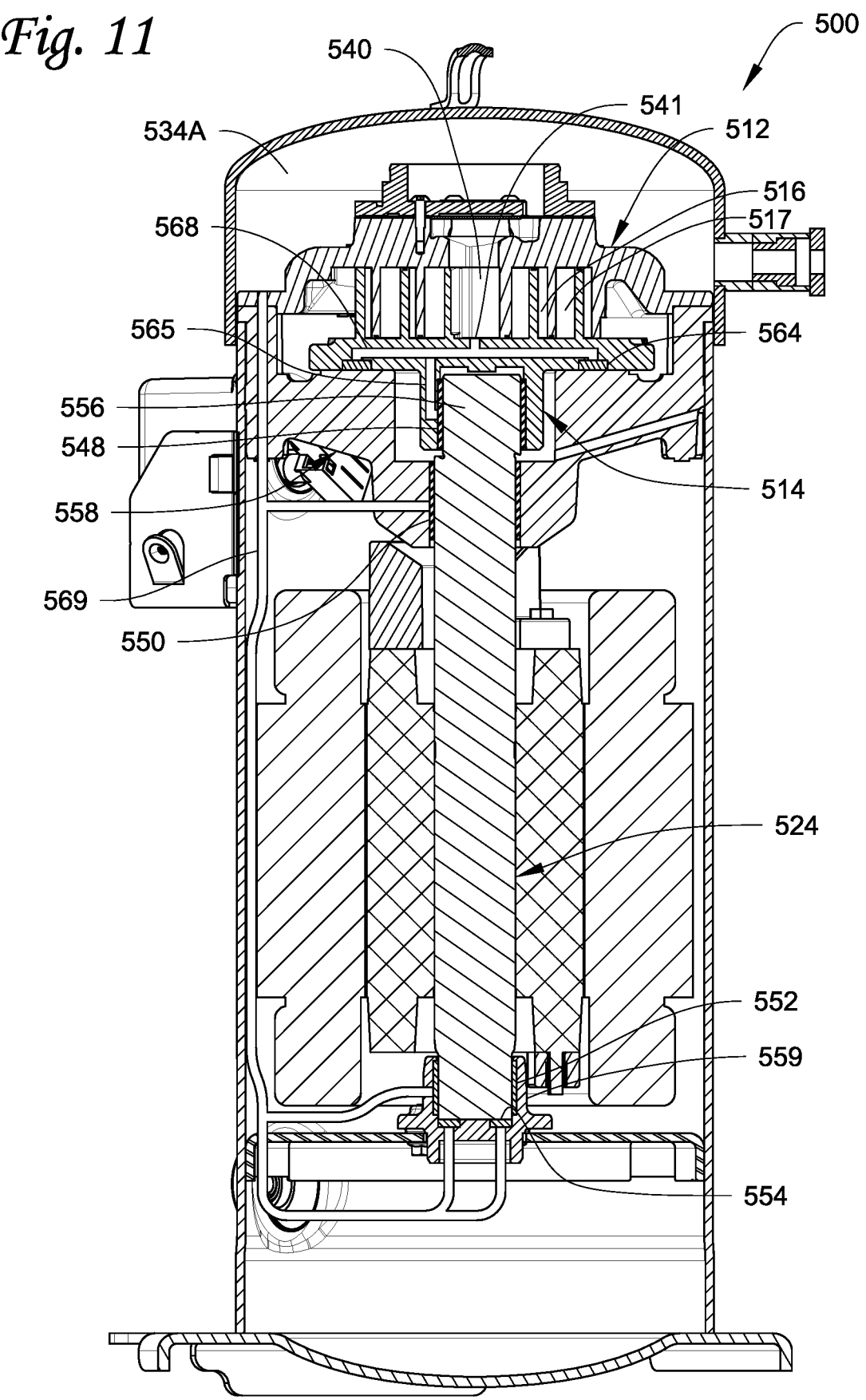
FIG. 11 shows a cross sectional view of an embodiment of an oil-free, vertical, single stage scroll compressor including aerostatic bearings to support the crankshaft and the orbiting scroll.

A cross-sectional view of a vertical, oil-free scroll compressor 500 is shown in FIG. 11. The scroll compressor 500 may have similar features to the scroll compressor 400 shown in FIGS. 8-10 and described above, except as described herein. The scroll compressor 500 includes radial aerostatic bearings to support the crankshaft 524 as it rotates. The scroll compressor 500 also includes an aerostatic thrust bearing that supports the orbiting scroll 514 in the axial direction as it orbits. The scroll compressor 500 also includes an aerostatic radial bearing on the eccentric end 556 of the crankshaft 524.

Each of the aerostatic bearings along the crankshaft includes a respective gas distributing structure 548, 550, 552, 554. As similarly discussed regarding FIG. 7, the scroll compressor 500 includes an aerostatic thrust bearing to support the orbiting scroll 514 in the axial direction. The aerostatic thrust bearing includes a gas distributing structure 564 that is located on the orbiting scroll 514. The gas distributing structure 564 in an embodiment may be located on the surface of the bearing housing 558, as similarly discussed above regarding FIGS. 2-6. A coupling device (e.g., Oldham coupling 30) has been omitted from the view shown in FIG. 11 for ease of understanding.

A first radial bearing for supporting the crankshaft 524 includes a gas distributing structure 550 that is located on the radial surface of the bearing housing 558. A second radial bearing for supporting the crankshaft 524 includes a gas distributing structure 552 that is located on a radial surface of a lower bearing housing 559. The radial surface of the lower bearing housing 559 is a surface of the lower bearing housing 559 that faces the radial surface of the crankshaft 524. A crankshaft aerostatic thrust bearing for supporting the crankshaft 524 in the axial direction as it rotates includes a gas distributing structure 554 that is located on an axial surface of the lower bearing housing 559. The axial surface 554 is a surface of the lower bearing housing 559 that faces an end of the crankshaft 524.

A passageway 569 fluidly connects the gas distributing structures 550, 552, 554 in the bearing housing 558 and lower bearing housing 559 to an upper volume 534A of the scroll compressor 500. Accordingly, pressurized gas is supplied from the upper volume 534A to the aerostatic bearings that support the crankshaft 524. Alternatively, the connecting pathway 569 in an embodiment may fluidly connect the gas distributing structures 550, 552, 554 for supporting the crankshaft 524 to an external source of pressurized gas (e.g. booster, compressor, or the like).

The orbiting scroll 514 includes pathways 565, 568 that fluidly connect a discharge volume 540 of the intermeshed fixed scroll 512 and orbiting scroll 514 to the gas distributing structures 548, 564 located on surfaces of the orbiting scroll 514. The pathway 568 provides pressurized gas from the discharge volume 540 to the aerostatic thrust bearings supporting the orbiting scroll 514 in the axial direction. The pathway 565 provides pressurized gas to the aerostatic radial bearing for the eccentric end 556 of crankshaft 524. In an embodiment, an inlet 541 for one or both of the passageways 565, 568 in an embodiment may be located at a different radial position such that pressurized gas is provided from an intermediately formed volume (e.g., trapped volume 516, trapped volume 517) instead of the discharge volume 640.

As discussed above, a booster (e.g., booster 70 shown in FIG. 2) may be utilized to provide a secondary source of pressurized gas for one or more of the aerostatic bearing. In an embodiment, a booster may be a primary source of pressurized gas that provides all of the pressurized gas to the aerostatic bearings. In an embodiment, a booster may be a primary source of pressurized gas for one or more of the aerostatic bearings.

One aspect of the distributing structures 550, 552 being located in bearing housing 558 and lower bearing housing 559 is that they do not rotate with the crankshaft 546. The gas distributing structures 550, 552 would not be under a centrifugal force as they are not rotated. This may be advantageous as the gas distributing structures 550, 552 may not have to be as strongly attached to the bearing housing 558 and lower bearing housing 559, respectively, to account for a centrifugal force.

If the gas distributing structures are affixed to a rotating member (e.g., the crankshaft 524), the flow of pressured gas through and out of the gas distributing structures may be affected by the centrifugal forces caused by their rotation. In an embodiment, the gas distributing structures may be designed to counteract possible flow issues caused by the centrifugal forces. However, the gas distributing structures 550, 552 may be advantageous in that they do not have to account for centrifugal forces because they are located in the bearing housing 558 and lower bearing housing 559.

This can be advantageous, for example, in a horizontal scroll compressor. In an embodiment of a horizontal scroll compressor, the gas distributing structures 550, 552 can have a configuration (e.g., internal and/or external structure, material properties) such that the outer surface of the gas distributing structure has a greater flow rate in the upward direction (e.g., the direction opposite the direction of gravity, the vertical upward direction). In an embodiment of a horizontal scroll compressor, the radial bearings may be configured to account for (e.g., counter) the weight of the crankshaft 524. The larger flowrate of gas in the upward direction can account for the weight of the crankshaft 524. As such, in an embodiment of a horizontal scroll compressor, the aerostatic radial bearing or bearings along the crankshaft 524 may provide greater support for the bottom of the crankshaft 524 to counter the weight of the crankshaft 524, even though the bottom surface is not constant due to the rotation of the crankshaft 524.

Figure 12:
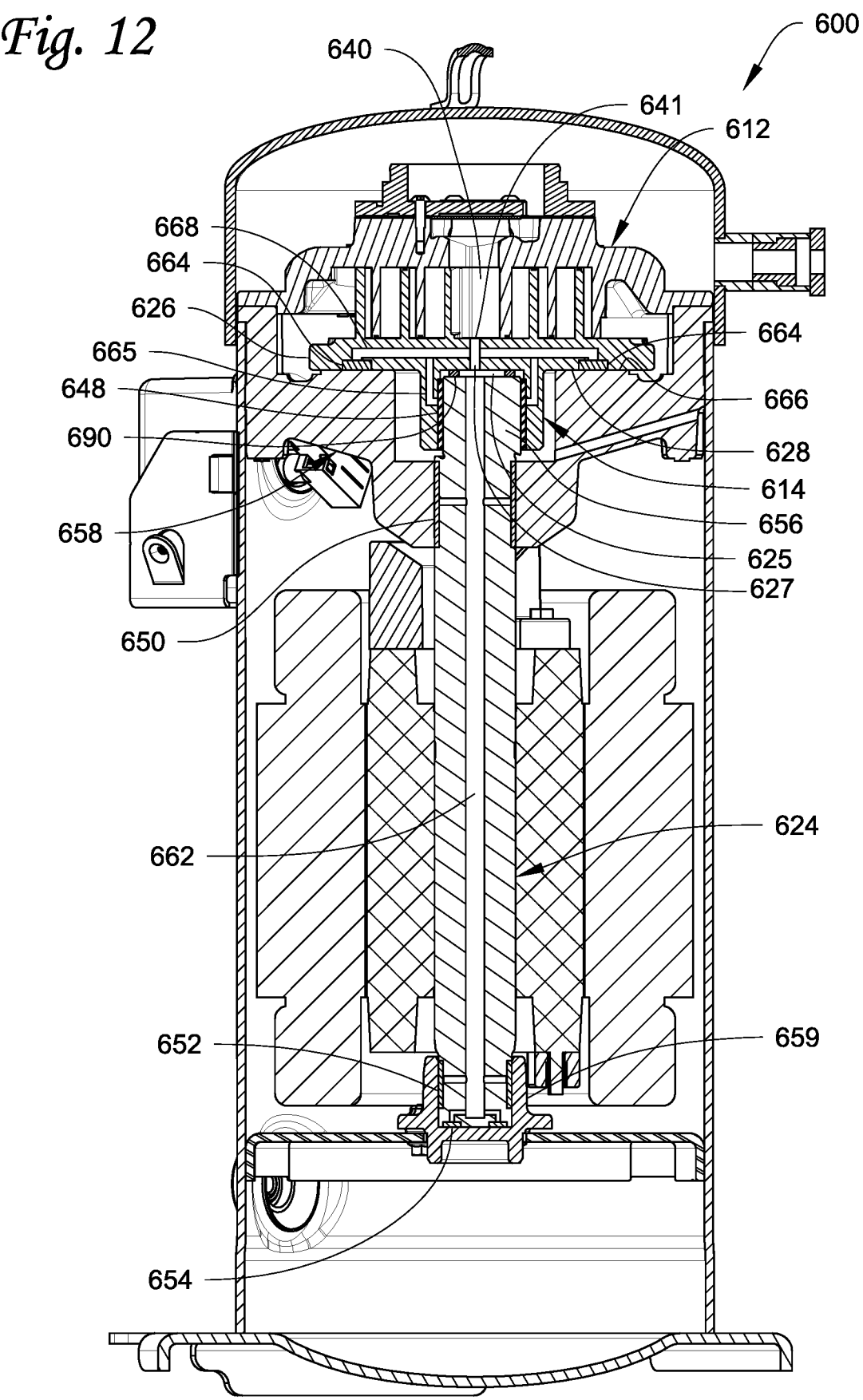
FIG. 12 shows a cross sectional view of an embodiment of an oil-free, vertical, single-stage compressor including aerostatic bearings in the orbiting scroll and the crankshaft.

In an embodiment of an oil-free scroll compressor 600, pressurized gas is supplied to the aerostatic bearings that support the crankshaft 624 via the orbiting scroll 614. The scroll compressor 600 is a vertical, single stage scroll compressor. FIG. 12 is a cross sectional view of the scroll compressor 600. A coupling device (e.g., Oldham coupling 30) has been omitted from view shown in FIG. 12 for ease of understanding. The scroll compressor 600 may have similar features to the scroll compressor 400 shown in FIGS. 8-10 and described above, except as shown and described herein.

In an embodiment of a scroll compressor 600, the baseplate 626 of the orbiting scroll 614 may include a pathway 627 that fluidly connects a discharge volume 640 of the intermeshing scrolls 612, 614 to a clearance volume 625. The clearance volume 625 is a volume located between an end of the crankshaft 624 (e.g. an end of the eccentric end 656) and the baseplate 626 of the orbiting scroll 614. The interior gallery 662 is also fluidly connected to the gas distributing structures 650, 652, 654 of the aerostatic bearings that support the crankshaft 624. As such, pressurized gas is supplied to the gas distributing structures 650, 652, 654 from the gas discharge volume 640 by way of the passageway 627 in the baseplate 628.

In an embodiment, a dynamic seal 690 is provided between an eccentric end 656 of the crankshaft 624 and the baseplate 628 of the orbiting scroll 614. The dynamic seal 690 may provide a seal between an axial surface of the eccentric end 656 of the crankshaft 624 and the axial surface of the baseplate 628. The dynamic seal 690 ensures that the pressurized gas flows from the passageway 627 to the interior gallery 662. During operation, the orbiting scroll 614 may shift relative to the crankshaft 624 in the axial direction. This shifting may be small because the scroll compressor 600 includes an aerostatic thrust bearing for supporting the orbiting scroll 614 in the axial direction. However, the dynamic seal 690 is made of a material that allows it to expand and contract to account for the possible axial shifting. As such, the dynamic seal 690 provides sealing between the baseplate 626 and the crankshaft 624 even if the axial distance between the crankshaft 624 and baseplate 626 changes.

Alternatively, in an embodiment the dynamic seal 690 may be a radial seal instead of an axial seal. The radial dynamic seal (not shown) in an embodiment may be located between a radial outer surface of the eccentric end 656 of the crankshaft 624 and the surface of the orbiting scroll 614 that faces the radial outer surface of the eccentric end 656. In such an embodiment, the radial dynamic seal would be located between the gas distributing structure 650 and the clearance volume 625. In an embodiment, the pathway 627 through the baseplate 626 and the interior gallery 662 may be fluidly connected by a rigid member (e.g. a tube) and a radial dynamic seal in a similar manner to the interior gallery 462 and connecting pathway 469 as described for FIG. 10B.

As shown in FIG. 12, the scroll compressor 600 also includes an aerostatic thrust bearing that supports the orbiting scroll 614 in the axial direction. In an embodiment, the aerostatic thrust bearing may be similar to the aerostatic thrust bearing shown and described above for FIG. 7. The orbiting scroll 614 also includes a gas distributing structure 648 for the aerostatic radial bearing for the eccentric end 656 of the crankshaft 624. In an embodiment, the aerostatic radial bearing for the eccentric end 656 may be similar to aerostatic radial bearing for the eccentric end 565 shown and described for FIG. 11. As shown in FIG. 12, two pathways 665, 668 fluidly connect the gas distributing structures 648, 664 located on the orbiting scroll 614 to the pathway 627 through the baseplate 626. In the illustrated embodiment, the pathways 665, 668 are shown as being fluidly connected to each other. However, the pathways 665, 668 in an embodiment may be separate such that each pathway 665, 668 separately supplies pressurized fluid from the pathway 627 through the baseplate 626 to its respective gas distributing structure 648, 664. In an embodiment, each pathway 665, 668 may include multiple pathways such that each pathway 665, 668 includes multiple pathways that separately supply pressurized gas to a respective gas distributing structure 648, 664. Accordingly, pressurized fluid from the discharge volume 640 is supplied to the aerostatic bearings located on the orbiting scroll 614.

Alternatively, an inlet 641 to the passageway 627 in an embodiment may be located at a different radial position such that pressurized gas is provided from an intermediately formed volume (e.g., trapped volume 616, trapped volume 617) instead of the discharge volume 640. In the illustrated embodiment, the gas distributing structure 648 for the eccentric end 656 of the crankshaft 624 is on the surface of the orbiting scroll 614. Alternatively, the gas distributing structure 648 in an embodiment may be located on a radial surface of the eccentric end of the crankshaft 624 as shown in FIG. 8.

In the manner described above, pressurized gas is supplied to the gas distributing structures 648, 650, 652, 654, 664 from the discharge volume 640. Accordingly, the gas distributing structure 648 distributes pressurized gas such that a layer of flowing pressurized gas is formed between a radial surface of the eccentric end 656 of the crankshaft 624 and a surface of the orbiting scroll 614.

The first and second aerostatic radial bearings can support the crankshaft 624 in the radial direction as it rotates. A gas distributing structure 650 of the first aerostatic radial bearing distributes pressurized gas such that a layer of flowing pressurized gas is formed between a radial surface of the bearing housing 658 and a radial surface of the crankshaft 624. This layer of flowing pressurized gas supports the crankshaft 624 in the radial direction.

A gas distributing structure 652 of the second aerostatic radial bearing distributes pressurized gas such that a layer of flowing pressurized gas is formed between a radial surface of the crankshaft 624 and a radial surface of a lower bearing housing 659. This layer of flowing pressurized gas supports the crankshaft 624 in the radial direction.

The crankshaft aerostatic thrust bearing can support the crankshaft 624 in the axial direction as the crankshaft 624 rotates. A gas distributing structure 654 of the crankshaft aerostatic thrust bearing distributes pressurized gas such that a layer of flowing pressurized gas is formed between an axial surface of an end of the crankshaft 624 and an axial surface of the lower bearing housing 659. This layer of pressurized gas supports the crankshaft 624 in the axial direction.

A gas distributing structure 664 of the aerostatic thrust bearing distributes pressurized gas such that a layer of flowing pressurized gas is formed between the back surface 626 of the orbiting scroll 614 and axial surface 666 of the bearing housing 658. The aerostatic thrust bearing can support the orbiting scroll 614 and its thrust force in the axial direction. The aerostatic thrust bearing supports the orbiting scroll 614 in the axial direction such that the thrust force does not push the orbiting scroll 614 out of its correct intermeshed position with the fixed scroll 612 and/or does not push the orbiting scroll 614 such that it contacts the bearing housing 658.

As previously discussed, a scroll compressor 600 may include a booster (e.g., the booster 70 shown in FIG. 1). In an embodiment, the booster can be fluidly connected to, for example, any of the various pathways (e.g., interior pathway 665, interior gallery 662, pathway 668) or volumes (e.g., discharge volume 640, upper volume 334A) that supply pressurized gas to one or more of the aerostatic bearings.

It should be understood that while the Figures show the gas distributing structures in FIGS. 2-12 as being embedded into the surface of a particular component (e.g., orbiting scroll, bearing housing, crankshaft, lower bearing housing), any of gas distributing structures described herein with respect to FIGS. 2-12 may be attached to an outer surface of the described component in an embodiment. In such embodiments, and the space between opposing surfaces may be configured to allow for such a configuration of the aerostatic bearing or bearings.

Figure 13:
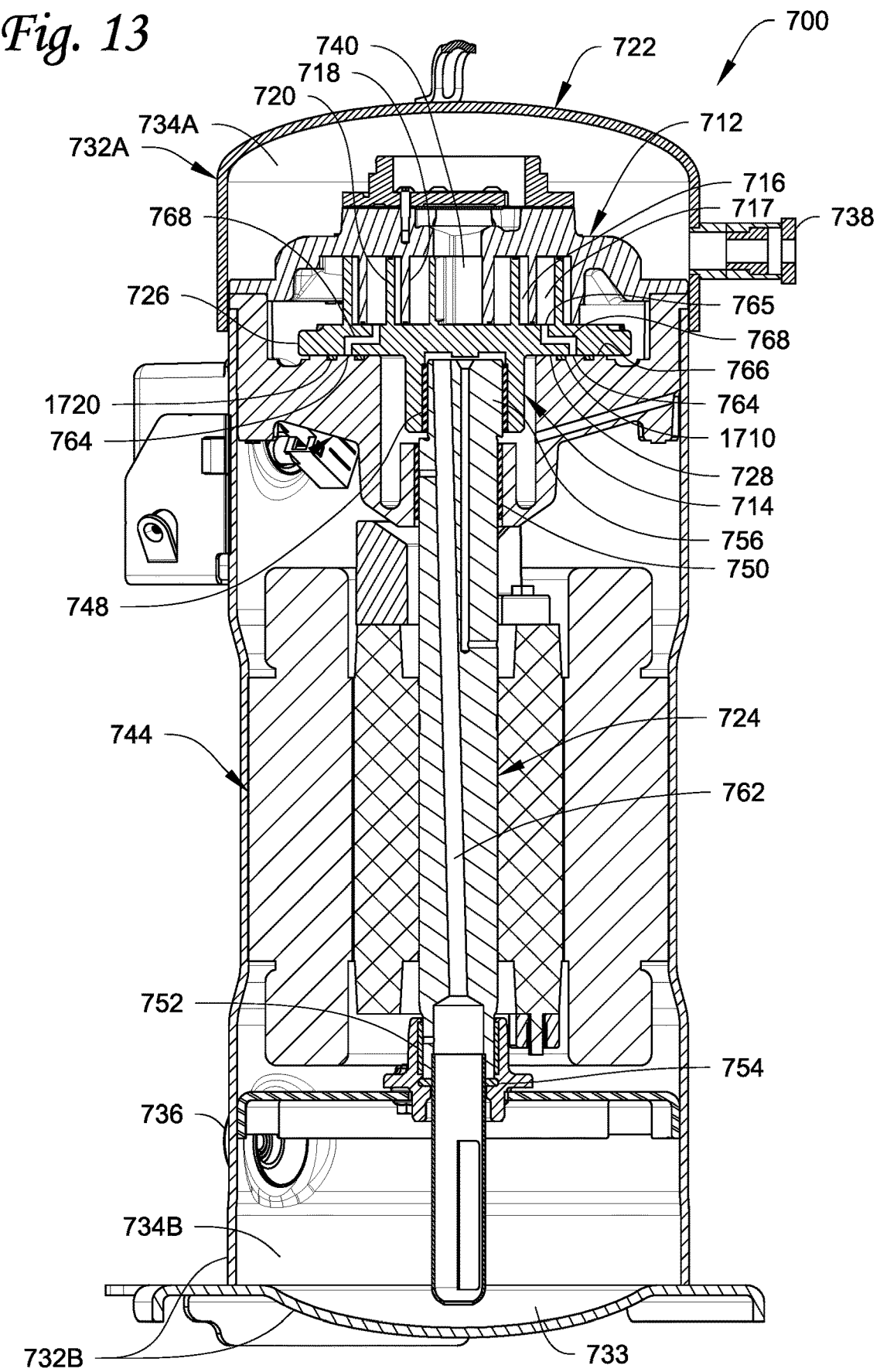
FIG. 13 shows a cross sectional view of an embodiment of a vertical, single-stage scroll compressor including an aerostatic thrust bearing that includes a gas distributing structure and radial seals.

FIG. 13 shows a cross section of an embodiment of a scroll compressor 700 having an aerostatic thrust bearing for supporting an orbiting scroll member 714. In an embodiment, the aerostatic thrust bearing includes a gas distributing structure with an opening 764 located in the back surface 728 of the orbiting scroll 714, an inner radial seal 1710, and an outer radial seal 1720. The scroll compressor 700 also includes a fixed scroll 712 with a spiral wrap 718. The orbiting scroll 714 includes a baseplate 726 and a spiral wrap 720 that projects from the baseplate 726 in a direction towards the fixed scroll 712. The fixed scroll 712 and orbiting scroll 714 and their respective wraps 718, 720 are intermeshed and are configured to compress gas (e.g., refrigerant) in a similar manner to the scroll compressor 10 shown in FIG. 2 and as described above. A coupling device (e.g., an Oldham coupling 30 as shown in FIG. 2) has been omitted from the view shown in FIG. 13 for ease of understanding.

The scroll compressor 700 in an embodiment includes an external housing 722 that has an upper portion 732A containing an upper volume 734A and a lower portion 732B containing a lower volume 734B similar to the compressor 10 shown in FIG. 2 and as described above. Gas in the lower volume 734B is suctioned into and compressed by intermeshed scrolls 712, 714, and then the compressed gas is discharged into the upper volume 734A from a discharge volume 740 of the scrolls 712, 714. Gas to be compressed enters the external housing 722 through a suction inlet 736 and compressed gas exits the external housing 722 through a discharge outlet 738.

The orbiting scroll 714 in an embodiment is orbited in a similar manner to the orbiting scroll 14 in the compressor 10 shown in FIG. 2 and as described above. The orbiting scroll 714 is attached to an eccentric end 756 of a crankshaft 724, and the crankshaft 724 is rotated by, for example, an electric motor 744. The electric motor 744 in an embodiment has a similar configuration to the electric motor 44 in FIG. 2 and as described above. For example, in an embodiment, the crankshaft 724 may be rotated by mechanisms other than an electric motor 744, such as, an external electric motor, an internal combustion engine, or other such mechanisms.

As shown in FIG. 13, the compressor 700 includes radial bearings 750, 752, and a thrust bearing 754 to support the crankshaft 724 while it rotates. The compressor 700 also includes a radial bearing 748 positioned on the eccentric end 756 of the crankshaft 724 to prevent rotational movement from being transferred to the orbiting scroll 714. Lubricant (e.g., oil) can be provided to the bearings 748, 750, 752, 754 along the crankshaft 724. In an embodiment, lubricant is provided to the bearings 748, 750, 752, 754 from a sump 733 by way of the interior gallery 762 in a similar manner as described regarding the compressor 10 in FIG. 2. The illustrated embodiment includes three radial bearings 748, 750, 752 and a thrust bearing 754 along the crankshaft 724. However, an embodiment may include one or more bearings as suitable to support the crankshaft 724 and allow the orbiting scroll 714 to be rotated and/or orbited correctly, relative to the fixed scroll 712.

Figure 14:
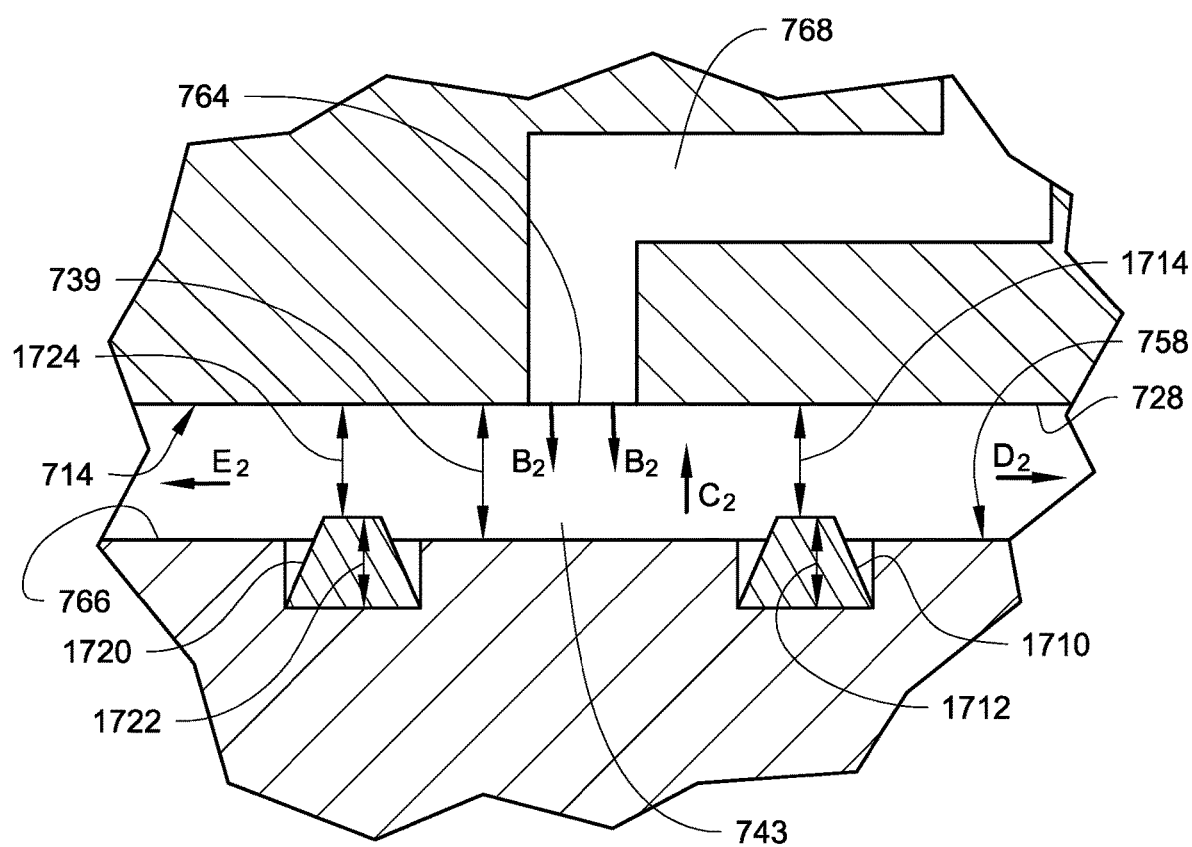
FIG. 14 shows an enlarged sectional view of the aerostatic thrust bearing in the vertical, single-stage scroll compressor shown of FIG. 2.

As shown in FIGS. 13 and 14, the aerostatic thrust bearing in an embodiment includes a back surface 728 of the orbiting scroll 714, a surface 766 of a bearing support member 758 that faces the back surface 728 of the orbiting scroll 714, and a gas distributing structure including an opening 764, an outer radial seal 1720, and an inner radial seal 1710. FIG. 14 is an enlarged view of the aerostatic thrust bearing of FIG. 13 in an embodiment. A pathway 768 in the orbiting scroll 714 fluidly connects an intermediate volume 717 of the scrolls 712, 714 to the opening 764 in the back surface 728 of the orbiting scroll 714. The pathway 768 has an opening 765 that is along the intermediate volume 717 of the scrolls 712, 714 in an embodiment. The pathway 768 allows compressed gas from the intermediate volume 717 to flow to the gas distributing structure.

The gas distributing structure in FIGS. 13 and 14 includes two openings 764, and the orbiting scroll 714 includes two pathways 768. For example, FIG. 14 shows a single opening 764 of the gas distributing structure. In an embodiment, the gas distributing structure may include one or more openings 764 in the back surface 728 of the orbiting scroll 714. In an embodiment, the gas distributing structure may include two or more openings 764 in the back surface 728 of the orbiting scroll 714. For example, the gas distributing structure in an embodiment may include five openings 764 in the back surface 728 of the orbiting scroll 714 located in similar positions to the inlets 174 shown in FIG. 5. In an embodiment, an orbiting scroll 714 may include a pathway 768 for each opening 754 (e.g., as shown in FIG. 13 for two openings 764). In an embodiment having multiple openings 764, an orbiting scroll 714 may include one or more pathways 786, and at least one of the pathways 786 may be fluidly connected to multiple openings 764 of the gas distributing structure.

During operation of the compressor 700, the intermediate volume 717 has a higher pressure than the lower volume 734B of the compressor. As shown in FIG. 13, the aerostatic thrust bearing is located in the lower volume 734B of the compressor 700. Accordingly, compressed gas flows from the intermediate volume 717 to a space 743 between the back surface 728 of the orbiting scroll 714 and the surface 766 of the bearing support member 758, then flows from the space 743 to the lower volume 734B of the compressor 700. Compressed gas is discharged from the opening 764 as shown by arrows $B_2$ in FIG. 14, and then flows radially outward (e.g., in direction $E_2$) or radially inward (e.g., in direction $D_2$). As gas flows through the space 743, the thrust load of the orbiting scroll 714 squeezes the flowing compressed gas between the back surface 728 of the orbiting scroll 714 and the surface 766 of the bearing support member 758. Accordingly, a layer of compressed gas is formed between the back surface 728 of the orbiting scroll 714 and the surface 766 of the bearing support member 758 as flows through the space 743. The layer of compressed gas formed by the aerostatic thrust bearing provides support in the direction $C_2$ to support the thrust load of the orbiting scroll 714.

The gas distributing structure in an embodiment also includes an inner radial seal 1710 and an outer radial seal 1720. The radial seals 1710, 1720 are located between the orbiting scroll 714 and the bearing support member 715 in an embodiment. Each of radial seals 1710, 1720 extends along the circumference of the back surface 728 of orbiting scroll 714. In an embodiment, each of the radial seals 1710, 1720 is ring shaped. The inner radial seal 1710 is located radially inward of the opening 764 and the outer radial seal 1720 is radially outward of the opening 764. In an embodiment, the inner radial seal 1710 may extend near the outer radius of the baseplate 726 of the orbiting scroll 714. The radial seals 1710, 1720 are embedded in the surface 766 of the bearing support structure 758. However, one or both of the radial seals 1710, 1720, may be provided on the surface of the 766 of the bearing support structure 758 without being embedded in an embodiment. In an embodiment, one or both of the radial seals 1710, 1720, may be provided on the back surface 728 of the orbiting scroll 714.

As shown in FIG. 14, the inner radial seal 1710 has a thickness 1712 (e.g., a dimension in the axial direction) and the outer radial seal 1720 has a thickness 1722 that results in the radial seals 1710, 1720 extending into the space 743. The inner radial seal 1710 creates a restriction 1714 for the compressed gas flowing radially inwardly (e.g., in direction $D_2$) and the outer radial seal 1720 forms a restriction 1724 for the compressed gas flowing radially outward (e.g., in direction $E_2$). Each of the restrictions 1714, 1724 has a length in the axial direction that is shorter than a length 739 of the space 743 in the axial direction. The radial seals 1710, 1720 in an embodiment allow a layer of pressurized gas to be formed between the radial seals 1710, 1720 in the radial direction, while also limiting the flow of compressed gas from between the portion of the space 743 between the radial seals 1710, 1720 in the radial direction. The radial seals 1710, 1720 in an embodiment are advantageous as they limit the amount of pressurized gas that needs to be provided to the space 743 to form a layer of pressured gas that adequately supports the orbiting scroll 714 in the radial direction.

As the restrictions 1714, 1724 have a length in the axial direction that is smaller than length 739 in the axial direction of the space 743, compressed gas is forced to compress more as it flows in the radial direction (e.g., in direction $E_2$ or direction $D_2$) through the restrictions 1714, 1724. Additionally, the orbit of the orbiting scroll 714 can cause the pressured gas in the space 743 to flow in an outward radial direction due to friction. As the compressed gas is forced in the radial outward direction, it is forced through the restrictions 1714, 1724 and is further compressed. As such, in addition to the aerostatic support provided by the aerostatic thrust bearing of FIGS. 13 and 14, the aerostatic thrust bearing may also provide portions of further compressed gas in the restrictions 1714, 1724 that provide aerodynamic support to the orbiting scroll 714. In such an embodiment, the aerostatic thrust bearing may also be referred to as a hybrid aerostatic/aerodynamic thrust bearing.

In an embodiment, the radial seals 1710, 1720, the pathway 768, and the opening 764 are configured so that the aerostatic thrust provides adequate support for the orbiting scroll 714 in the axial direction while limiting the amount of compressed gas needed to provide said adequate support. The radial seals 1710, 1720 in an embodiment may be configured to have a specific length 1712, 1722 so as to provide a desired length in the axial direction for the restrictions 1714, 1724. For example, it may be desired in an embodiment that the length of the restrictions 1714, 1724 in the axial direction are small so as to minimize the flow of compressed gas from the space 743. The pathway 768 in an embodiment may be configured to connect to a different volume of the intermeshed scrolls (e.g., intermediate volume 716, discharge volume 740) or to have a different size (e.g., cross-sectional area) to control amount of gas that flow one of the more of the openings 764 of the gas distributing structure. As discussed above, the gas distributing structure in an embodiment may have one or more openings 764 to allow compressed gas to adequately flow into and be distributed around the circumference of the back surface 728 of the orbiting scroll 714.

In an embodiment, the opening 764 may be provided on the surface 766 of bearing support member 758 instead of the orbiting scroll 714. In such an embodiment, the compressor 700 may include a pathway, which extends in part through the bearing support member 758 to provide compressed gas. For example, the pathway in such an embodiment may be similar to the pathway 68 as shown in FIG. 2 and as described above.

As previously discussed, a scroll compressor 700 may include a booster (e.g., the booster 70 shown in FIG. 1). In an embodiment, the booster can be fluidly connected to, for example, a pathway (e.g., pathway 768, pathway 68) or a volume (e.g., discharge volume 740, upper volume 734A, intermediate volume 717) that supply pressurized gas to the aerostatic thrust bearing. In an embodiment, the gas distributing structure may also include a porous material as discussed above with respect to FIG. 2 or FIG. 7.

Figure 15:
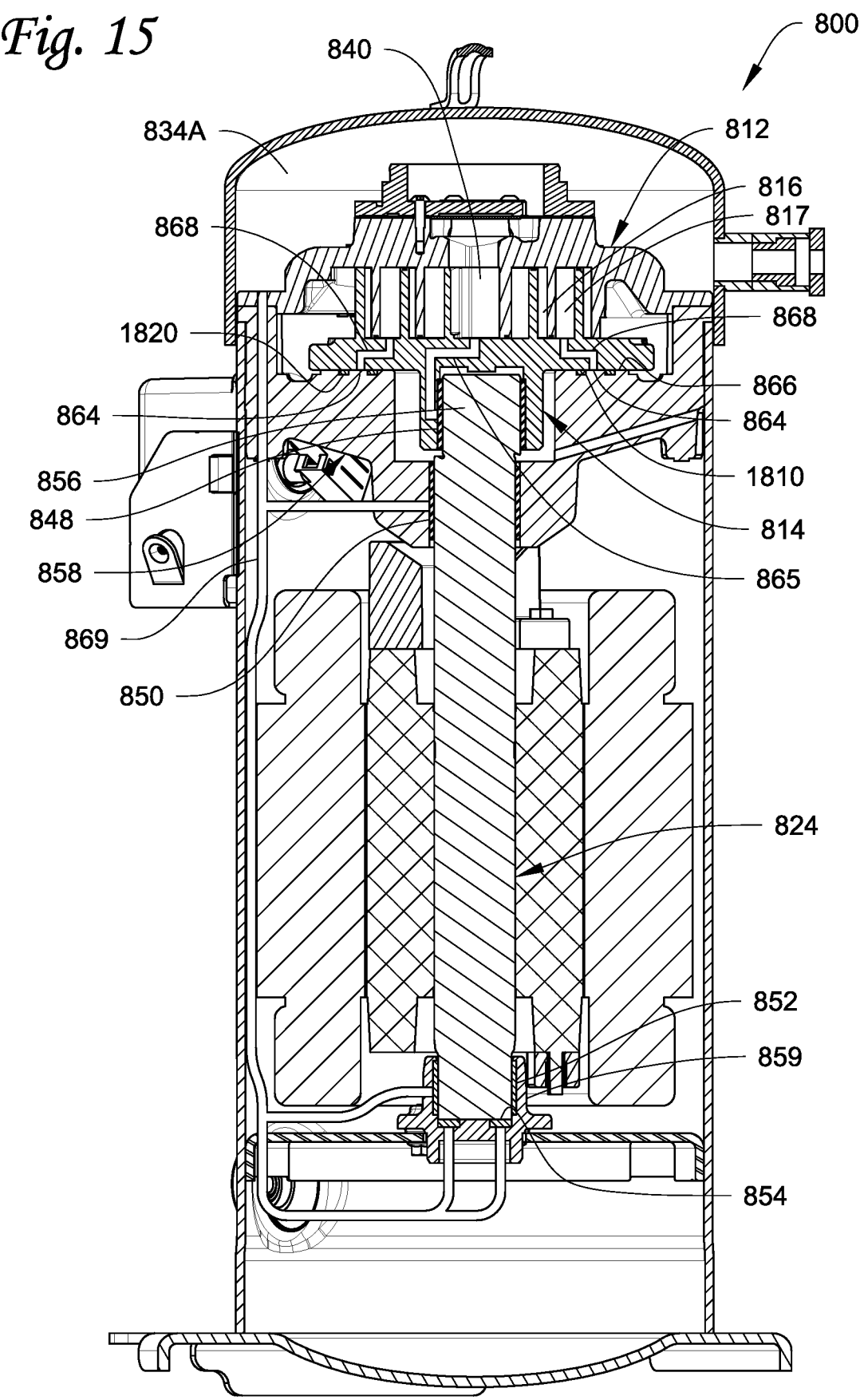
FIG. 15 shows a cross sectional view of an embodiment of an oil-free, vertical, single stage scroll compressor including aerostatic bearings to support the crankshaft and an aerostatic thrust bearing to support an orbiting scroll that includes radial seals to support an orbiting scroll.

A cross-sectional view of a vertical, oil-free scroll compressor 800 is shown in FIG. 15. The scroll compressor 800 may have similar features to the scroll compressor 700 shown in FIG. 14 and as described above, except as described herein. The oil-free scroll compressor 800 includes an aerostatic thrust bearing to support the orbiting scroll 814 in the axial direction similar to the aerostatic thrust bearing as shown in FIG. 14 and described above. As shown in FIG. 15, the aerostatic thrust bearing in an embodiment includes a back surface 828 of the orbiting scroll 814, a surface 866 of a bearing support member 858, a gas distributing structure having an opening 864, an outer radial seal 1820, and an inner radial seal 1810. The aerostatic thrust bearing in an embodiment may have a similar configuration to the aerostatic thrust bearing shown in FIG. 14 and as discussed above.

The compressor 800 has aerostatic bearings along the crankshaft 824. The aerostatic bearing along the crankshaft 824 illustrated in FIG. 15 are similar to the aerostatic bearings along the crankshaft 524 as shown in FIG. 11 and as discussed above. In an embodiment, the configuration of the aerostatic bearings and the configuration for providing compressed gas to the aerostatic bearings in FIG. 15 may be similar to the aerostatic bearings as shown in FIG. 11 and as discussed above. Each of the aerostatic bearings along the crankshaft 824 includes a respective gas distributing structure 848, 850, 852, 854. Each of the gas distributing structures 848, 850, 852, 854 includes a porous material.

In an embodiment, a pathway 865 fluidly connects the discharge volume 840 to the gas distributing structure 848. Accordingly, pressurized gas is provided to the aerostatic radial bearing along the eccentric end 856 of the crankshaft. In an embodiment, the pathway 865 may be connected to a different volume (e.g., intermediate volume 816, intermediate volume 817). In an embodiment, the pathway 865 may connect to the pathway(s) 868 that provide compressed gas to the gas distributing structure 864. A passageway 869 fluidly connects the gas distributing structures 850, 852, 854 in the bearing housing 858 and lower bearing housing 859 to an upper volume 834A of the scroll compressor 800. Accordingly, pressurized gas is supplied from the upper volume 834A to the aerostatic bearings along the crankshaft 824. Alternatively or additionally, the connecting pathway 869 in an embodiment may fluidly connect the gas distributing structures 850, 852, 854 for supporting the crankshaft 524 to an external source of pressurized gas (e.g. booster, compressor, or the like).

The compressor 800 shown in FIG. 15 has three aerostatic radial bearings and one aerostatic thrust bearing along the crankshaft 824. However, an embodiment may include one or more aerostatic bearings in any specific location along the crankshaft 24. Bearings may be included as suitable to support the crankshaft 824 and to allow the orbiting scroll 814 to be rotated and/or orbited correctly, relative to the fixed scroll 812.

In an embodiment one or more of the gas distributing structures 848, 850, 852, 854 may be provided in the crankshaft 824 instead of a bearing housing 858, 859 or the orbiting scroll 814. For example, in such an embodiment, the configuration of the aerostatic bearings and the configuration for providing compressed gas to the aerostatic bearings in FIG. 15 may be similar to the aerostatic bearings as shown in FIG. 8 and as discussed above. For example, in such an embodiment, the configuration of the aerostatic bearings and the configuration for providing compressed gas to the aerostatic bearings in FIG. 15 may be similar to the aerostatic bearings as shown in FIG. 12 and as discussed above.

Aspects

Any of aspects 1-16 can be combined with any of aspects 17-39, and any of aspects 17-21 can be combined with any of aspects 22-39.

Aspect 1. A scroll compressor, comprising:
a first scroll member having a baseplate and a spiral wrap that projects from a surface of the baseplate;
a second scroll member having a baseplate and a spiral wrap that projects from a surface of the baseplate;
an aerostatic thrust bearing that supports the second scroll member in the axial direction and includes: a surface of the second scroll member, a surface of a fixed supporting member, and a gas distributing structure, wherein
a source of pressurized gas supplies pressurized gas to the gas distributing structure; and
the gas distributing structure forms a layer of gas between the surface of the fixed supporting member and the surface of the second scroll member.

Aspect 2. The scroll compressor of aspect 1, wherein the pressurized gas includes gas that has been compressed by the first scroll member and the second scroll member.

Aspect 3. The scroll compressor of either one of aspects 1 or 2, wherein the gas distributing structure includes two or more portions and each portion is supplied with the pressurized gas.

Aspect 4. The scroll compressor of any one of the aspects 1-3, wherein an upper surface of the gas distributing structure is ring shaped such that the gas distributing structure distributes gas along an entire circumference of the surface of the second scroll member.

Aspect 5. The scroll compressor of any one of the aspects 1-4, wherein an upper surface of the gas distributing structure is sloped.

Aspect 6. The scroll compressor of any of the aspects 1-5, wherein the gas distributing structure is located on the back surface of the second scroll member.

Aspect 7. The scroll compressor of any one of aspects 1-6, further comprising:
a pathway within the second scroll member that fluidly connects a volume between the first scroll member and the second scroll member to the gas distributing structure, wherein
the volume between the first scroll member and the second scroll member is the source of the pressurized gas.

Aspect 8. The scroll compressor of any one of aspects 1-5, wherein the gas distributing structure is located on the surface of the fixed supporting member.

Aspect 9. The scroll compressor of any one of aspects 1-6 and 8, further comprising:
an upper volume, wherein gas compressed by the first scroll member and second scroll member is discharged into the upper volume; and
a connecting pathway that fluidly connects the upper volume to the gas distributing structure, wherein
the source of pressurized gas is the upper volume.

Aspect 10. The scroll compressor of any one of the aspects 1-9, wherein the source of pressurized gas includes an external source of pressurized gas.

Aspect 11. The scroll compressor of any one of the aspects 1-10, wherein the gas distributing structure includes a porous material.

Aspect 12. The scroll compressor of any one of aspects 1-11, wherein the gas distributing structure includes an inner radial seal and an outer radial seal, the inner radial seal and the outer radial seal located between the second scroll member and the fixed supporting member.

Aspect 13. The scroll compressor of any one of aspects 1-12, wherein the gas distributing structure further includes one or more openings in the back surface of the second scroll member or the surface of the fixed supporting member, the one or more openings located between the inner radial seal and the outer radial seal in a radial direction of the second scroll member.

Aspect 14. The scroll compressor of any of aspects 1-13, further comprising:
a flow control device that controls a flow of the pressurized gas supplied to gas distributing structure Aspect 15. The scroll compressor of any of the aspects 1-14, further comprising:
a suction inlet for inlet gas;
a lower volume that is fluidly connected to an inlet of the first and second scroll members and fluidly connected to the suction inlet, wherein
gas flowing into the inlet of the first and second scroll members includes gas exited from the gas distributing structure.

Aspect 16. The scroll compressor of any of the aspects 1-15, further comprising:
a booster providing a secondary source of pressurized gas for the gas distributing structure.

Aspect 17. A method of supporting a rotating or orbiting scroll member in a scroll compressor, where a fixed supporting member is positioned within the scroll compressor such that a surface of the fixed supporting member faces a surface of the rotating or orbiting scroll member, the method comprising:
providing a gas distributing structure on the surface of the fixed supporting member or the surface of the rotating or orbiting scroll member;
supplying pressurized gas to the gas distributing structure from a source of pressurized gas; and
the gas distributing structure forming a layer of gas between the rotating or orbiting scroll member and the fixed supporting member, the layer of gas supporting a thrust load of the rotating or orbiting scroll member.

Aspect 18. The method of aspect 17, wherein the gas distributing structure includes a porous material.

Aspect 19. The method of either aspects 17 or 18, wherein the gas distributing structure comprises an inner radial seal and an outer radial seal, the inner radial seal and the outer radial seal located between the rotating or orbiting scroll member and the fixed supporting member.

Aspect 20. The method of any one of aspects 17-19, wherein the source of pressurized gas includes an internal source of pressurized gas.

Aspect 21. The method of any one of aspects 17-20, further comprising:
supplying pressurized gas to the gas distributing structure from a secondary source of pressurized gas when the flow rate or pressure of the pressurized gas from the source of pressurized gas is not large enough to support the thrust load.

Aspect 22. An oil-free scroll compressor, comprising:
a first scroll member having a baseplate and a spiral wrap that projects from the baseplate;
a second scroll member having a baseplate and a spiral wrap that projects from the baseplate;
an aerostatic thrust bearing that supports the second scroll member in an axial direction and comprises:
a back surface of the baseplate of the second scroll member,
a surface of a fixed supporting member, and
a gas distributing structure on one of the back surface of the second scroll member or the surface of the fixed supporting member, wherein
the gas distributing structure forms a layer of pressurized gas between the back surface of the baseplate of the second scroll member and the surface of the fixed supporting member, when supplied with pressurized gas;
a crankshaft that rotates or orbits the second scroll member; and
an aerostatic radial bearing to support the crankshaft while the crankshaft rotates, the aerostatic radial bearing comprising:
an outer surface of the crankshaft,
a supporting surface that faces the outer surface of the crankshaft, and
a second gas distributing structure on one of the outer surface of the crankshaft or the support surface, wherein
the gas distributing structure forms a layer of gas between the outer surface of the crankshaft and the supporting surface that faces the outer surface of the crankshaft, when supplied with pressurized gas.

Aspect 23. The oil-free scroll compressor of aspect 22, wherein the gas distributing structure is located on the back surface of the second scroll member.

Aspect 24. The oil-free scroll compressor of either of aspects 22 or 23, further comprising:
a pathway within the second scroll member that fluidly connects a volume between the first scroll member and the second scroll member to the gas distributing structure, the pathway configured to supply the pressurized gas to the gas distributing structure from the volume between the first scroll member and the second scroll member.

Aspect 25. The oil-free scroll compressor of any one of aspects 22-23, wherein the gas distributing structure is located on the surface of the fixed supporting member.

Aspect 26. The oil-free scroll compressor of any one of aspects 22 or 25, further comprising:
an upper volume, wherein gas compressed by the first scroll member and second scroll member is discharged into the upper volume; and
a connecting pathway that fluidly connects the upper volume to the gas distributing structure, the connecting pathway configured to supply the pressurized gas to the gas distributing structure from the upper volume.

Aspect 27. The oil-free scroll compressor of any one of aspects 22-26, wherein the pressurized gas is supplied to the gas distributing structure from an external source of pressurized gas.

Aspect 28. The oil-free scroll compressor of any one of aspects 22-27, wherein the gas distributing structure includes a porous material.

Aspect 29. The oil-free scroll compressor of any one of aspects 22-28, wherein the gas distributing structure includes an inner radial seal and an outer radial seal, the inner radial seal and the outer radial seal located between the second scroll member and the fixed supporting member.

Aspect 30. The scroll compressor of any one of aspects 22-29, wherein the gas distributing structure includes one or more openings on the back surface of the second scroll member or the surface of the fixed supporting member, the one or more openings located between the inner radial seal and the outer radial seal in a radial direction of the second scroll member.

Aspect 31. The scroll compressor of any one of aspects 22-30, further comprising:
a suction inlet for inlet gas;
a lower volume that is fluidly connected to an inlet of the first and second scroll members and fluidly connected to the suction inlet, wherein
gas flowing into the inlet of the first and second scroll members includes gas distributed by the gas distributing structure.

Aspect 32. The oil-free scroll compressor of any one of aspects 22-31, wherein the pressurized gas supplied to the gas distributing structure includes gas that has been compressed by the first scroll member and the second scroll member.

Aspect 33. The oil-free scroll compressor of any one of aspects 22-32, wherein
the second gas distributing structure is located on the outer surface of the crankshaft; and
the crankshaft includes an interior gallery fluidly connected to the second gas distributing structure, the interior gallery configured to supply the second gas distributing structure with the pressurized gas.

Aspect 34. The oil-free scroll compressor of either of any one of aspects 22-33, further comprising:
a passageway in the baseplate of the second scroll member, the passageway fluidly connecting a volume between the first and second scroll members to the interior gallery of the crankshaft.

Aspect 35. The oil-free scroll compressor of aspect 34, wherein the volume between the first and second scroll members is a discharge volume of the first and second scroll members.

Aspect 36. The oil-free scroll compressor of aspect 34, wherein the volume between the first and second scroll members is an intermediate volume of the first and second scroll members.

Aspect 37. The oil-free scroll compressor of any one of aspects 22-32, wherein the second gas distributing structure is located on the supporting surface.

Aspect 38. The oil free scroll compressor of any one of aspects 22-37, wherein an internal source of pressurized gas supplies the pressurized gas for the second gas distributing structure.

Aspect 39. The oil free scroll compressor of any one of aspects 22-38, further comprising:
an aerostatic thrust bearing to support the crankshaft while the crankshaft rotates, the aerostatic thrust bearing comprising an axial surface of the crankshaft, a supporting surface that faces the axial surface of the crankshaft, and a third gas distributing structure, wherein
the gas distributing structure forms a layer of gas between the axial surface of the crankshaft and the supporting surface that faces the axial surface of the crankshaft, when supplied with a pressurized gas.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. An oil-free scroll compressor, comprising:
a first scroll member having a baseplate and a spiral wrap that projects from a surface of the baseplate;
a second scroll member having a baseplate and a spiral wrap that projects from a surface of the baseplate, the first scroll member and the second scroll member are intermeshed to compress working fluid into pressurized gas;
an aerostatic thrust bearing that supports the second scroll member in an axial direction and includes: a surface of the second scroll member, a surface of a fixed supporting member, and a gas distributing structure comprising a porous material;
a crankshaft that rotates or orbits the second scroll member; and
a radial bearing to support the crankshaft while the crankshaft rotates, wherein
a portion of the pressurized gas is supplied to the gas distributing structure such that the pressurized gas flows through the porous material of the gas distributing structure and is distributed from the porous material so that a layer of the pressurized gas is formed between the surface of the fixed supporting member and the surface of the second scroll member.

2. The scroll compressor of claim 1, wherein the radial bearing is one of a ball bearing and a roller bearing.

3. The scroll compressor of claim 1, wherein the radial bearing is a gas bearing.

4. The scroll compressor of claim 3, wherein the radial bearing is an aerostatic radial bearing.

5. The scroll compressor of claim 1, wherein an external surface of the porous material of the gas distributing structure is ring shaped such that the porous material distributes the pressurized gas along an entire circumference of the surface of the second scroll member.

6. The scroll compressor of claim 1, wherein an external surface of the porous material of the gas distributing structure is sloped.

7. The scroll compressor of claim 1, wherein the porous material includes two or more separated portions and each of the two or more separated portions is provided with the pressurized gas.

8. The scroll compressor of claim 1, wherein the porous material is located on the surface of the second scroll member.

9. The scroll compressor of claim 8, further comprising:
a pathway within the second scroll member that fluidly connects a volume between the first scroll member and the second scroll member to the gas distributing structure, wherein
the portion of the pressurized gas is supplied from the volume between the first scroll member and the second scroll member.

10. The scroll compressor of claim 1, wherein the porous material is located on the surface of the fixed supporting member.

11. The scroll compressor of claim 10, further comprising:
an upper volume, wherein the pressurized gas is discharged from between the first scroll member and the second scroll member into the upper volume; and
a connecting pathway that fluidly connects the upper volume to the gas distributing structure, wherein
the portion of the pressurized gas is supplied via the upper volume.

12. The scroll compressor of claim 1, wherein the gas distributing structure includes an inner radial seal and an outer radial seal, the inner radial seal and the outer radial seal located between the second scroll member and the fixed supporting member.

13. The scroll compressor of claim 12, wherein the gas distributing structure further includes one or more openings in the surface of the second scroll member or the surface of the fixed supporting member, the one or more openings located between the inner radial seal and the outer radial seal in a radial direction of the second scroll member.

14. The scroll compressor of claim 13, wherein the gas distributing structure includes two or more of the one or more openings.

15. The scroll compressor of claim 1, further comprising:
a booster providing a secondary source of pressurized gas for the gas distributing structure.

16. An oil-free scroll compressor, comprising:
a first scroll member having a baseplate and a spiral wrap that projects from a surface of the baseplate;
a second scroll member having a baseplate and a spiral wrap that projects from a surface of the baseplate;
an aerostatic thrust bearing that supports the second scroll member in an axial direction and includes: a surface of the second scroll member, a surface of a fixed supporting member, and a gas distributing structure comprising a porous material, the porous material being located on one of the second scroll member or the fixed supporting member with an external surface of the porous material facing one of the surface of the fixed supporting member or the surface of the second scroll member, respectively;
a crankshaft that rotates or orbits the second scroll member; and
a radial bearing to support the crankshaft while the crankshaft rotates, wherein
a source of pressurized gas supplies pressurized gas to the gas distributing structure such that the pressurized gas flows through the porous material of the gas distributing structure and is distributed from the external surface of the porous material so that a layer of the pressurized gas is formed between the surface of the fixed supporting member and the surface of the second scroll member.

17. The scroll compressor of claim 16, wherein the porous material is located on the surface of the second scroll member, and the external surface of the porous material faces the surface of the fixed supporting member.

18. The scroll compressor of claim 16, wherein the porous material is located on the surface of the fixed supporting member, and the external surface of the porous material faces the surface of the second scroll member.

* * * * *